(12) United States Patent
Ball et al.

(10) Patent No.: US 7,752,024 B2
(45) Date of Patent: Jul. 6, 2010

(54) SYSTEMS AND METHODS FOR CONSTRUCTING MULTI-LAYER TOPOLOGICAL MODELS OF COMPUTER NETWORKS

(75) Inventors: Scott Ball, Newmarket, NH (US); Joseph Greenwald, Madbury, NH (US); Christopher Buia, Dover, NH (US); David K. Taylor, Durham, NH (US); Jonathan P. Caron, Nottingham, NH (US); Jun He, San Jose, CA (US)

(73) Assignee: Computer Associates Think, Inc., Islandia, NY (US)

( * ) Notice: Subject to any disclaimer, the term of this patent is extended or adjusted under 35 U.S.C. 154(b) by 167 days.

(21) Appl. No.: 10/282,869

(22) Filed: Oct. 29, 2002

(65) Prior Publication Data

US 2003/0046390 A1 Mar. 6, 2003

(51) Int. Cl.
G06F 17/50 (2006.01)
(52) U.S. Cl. .................... 703/13; 703/1; 709/220; 709/225; 709/226; 715/771; 715/853
(58) Field of Classification Search .................... 703/21, 703/22, 6, 13; 714/1, 15; 709/220, 225, 709/226; 707/203
See application file for complete search history.

(56) References Cited

U.S. PATENT DOCUMENTS

| | | | |
|---|---|---|---|
| 4,827,411 A | 5/1989 | Arrowood et al. | |
| 5,127,005 A | 6/1992 | Oda et al. | |
| 5,159,685 A | 10/1992 | Kung | |
| 5,261,044 A | 11/1993 | Dev et al. | |
| 5,295,244 A | 3/1994 | Dev et al. | |
| 5,297,138 A | 3/1994 | Black | |
| 5,317,725 A | 5/1994 | Smith et al. | |
| 5,367,667 A | 11/1994 | Wahlquist et al. | |
| 5,377,196 A | 12/1994 | Godlew et al. | |
| 5,436,909 A | 7/1995 | Dev et al. | |
| 5,521,910 A | 5/1996 | Matthews | |
| 5,539,877 A | 7/1996 | Winokur et al. | |
| 5,559,955 A | 9/1996 | Dev et al. | |
| 5,568,491 A | 10/1996 | Beal et al. | |
| 5,590,120 A | 12/1996 | Vaishnavi et al. | |
| 5,608,874 A | 3/1997 | Ogawa et al. | |
| 5,627,819 A | 5/1997 | Dev | |
| 5,649,103 A | 7/1997 | Datta et al. | |
| 5,666,481 A | 9/1997 | Lewis | |
| 5,675,741 A | 10/1997 | Aggarwal | |
| 5,684,800 A | 11/1997 | Dobbins et al. | |

(Continued)

OTHER PUBLICATIONS

Harry Newton, Netwon's Telecom Dictionary, 2004, CMP Books, Twentieth Edition, p. 491.*

(Continued)

Primary Examiner—Jason Proctor
(74) Attorney, Agent, or Firm—Pillsbury Winthrop Shaw Pittman LLP

(57) ABSTRACT

A network management system includes a fault diagnosis engine, a topology mapper, an impact analyzer and a help desk system. The topology mapper includes a discovery module, a memory, and a presentation module. The discovery module is constructed and arranged to discover network elements in a communications network. The memory constructed and arranged to store topology data received from the discovery module. The presentation module constructed and arranged to present data related to topology of the communication network.

23 Claims, 35 Drawing Sheets

U.S. PATENT DOCUMENTS

| | | | |
|---|---|---|---|
| 5,687,290 A | 11/1997 | Lewis | |
| 5,691,917 A | 11/1997 | Harrison | |
| 5,696,486 A | 12/1997 | Poliquin et al. | |
| 5,706,436 A | 1/1998 | Lewis et al. | |
| 5,727,157 A | 3/1998 | Orr | |
| 5,729,685 A | 3/1998 | Chatwani et al. | |
| 5,734,642 A | 3/1998 | Vaishnavi et al. | |
| 5,734,824 A | 3/1998 | Choi | |
| 5,748,781 A | 5/1998 | Datta et al. | |
| 5,751,965 A | 5/1998 | Mayo et al. | |
| 5,751,967 A | 5/1998 | Raab et al. | |
| 5,768,501 A | 6/1998 | Lewis | |
| 5,777,549 A | 7/1998 | Arrowsmith et al. | |
| 5,787,234 A | 7/1998 | Molloy | |
| 5,793,362 A | 8/1998 | Matthews et al. | |
| 5,809,282 A * | 9/1998 | Cooper et al. | 709/226 |
| 5,822,302 A | 10/1998 | Scheetz et al. | |
| 5,832,503 A | 11/1998 | Malik et al. | |
| 5,850,397 A | 12/1998 | Raab et al. | |
| 5,864,662 A | 1/1999 | Miller et al. | |
| 5,872,911 A | 2/1999 | Berg | |
| 5,889,953 A | 3/1999 | Thebaut et al. | |
| 5,907,696 A | 5/1999 | Stilwell et al. | |
| 5,926,463 A | 7/1999 | Ahearn et al. | |
| 5,951,649 A | 9/1999 | Dobbins et al. | |
| 5,987,442 A | 11/1999 | Lewis et al. | |
| 6,003,090 A | 12/1999 | Puranik et al. | 709/235 |
| 6,006,016 A | 12/1999 | Faigon et al. | |
| 6,009,440 A * | 12/1999 | Watson et al. | 707/203 |
| 6,012,152 A | 1/2000 | Douik et al. | |
| 6,014,697 A | 1/2000 | Lewis et al. | 709/223 |
| 6,026,442 A | 2/2000 | Lewis et al. | 709/229 |
| 6,026,500 A | 2/2000 | Topff et al. | 714/26 |
| 6,032,184 A | 2/2000 | Cogger et al. | |
| 6,041,383 A | 3/2000 | Jeffords et al. | 710/200 |
| 6,049,828 A | 4/2000 | Dev et al. | |
| 6,055,561 A | 4/2000 | Feldman et al. | |
| 6,064,304 A | 5/2000 | Arrowsmith et al. | 340/506 |
| 6,069,895 A | 5/2000 | Ayandeh | 370/399 |
| 6,072,777 A | 6/2000 | Bencheck et al. | |
| 6,079,020 A | 6/2000 | Liu | 713/201 |
| 6,084,858 A | 7/2000 | Matthews et al. | 370/238 |
| 6,101,180 A | 8/2000 | Donahue et al. | 370/352 |
| 6,101,500 A | 8/2000 | Lau | 707/103 |
| 6,112,251 A | 8/2000 | Rijhsinghani | 709/249 |
| 6,115,362 A | 9/2000 | Bosa et al. | 370/248 |
| 6,131,112 A | 10/2000 | Lewis et al. | 709/207 |
| 6,141,720 A | 10/2000 | Jeffords et al. | 710/200 |
| 6,141,777 A | 10/2000 | Cutrell et al. | |
| 6,147,995 A | 11/2000 | Dobbins et al. | 370/392 |
| 6,158,011 A | 12/2000 | Chen et al. | 713/201 |
| 6,173,399 B1 | 1/2001 | Gilbrech | 713/153 |
| 6,182,136 B1 * | 1/2001 | Ramanathan et al. | 709/224 |
| 6,185,619 B1 | 2/2001 | Joffe et al. | 709/229 |
| 6,195,349 B1 | 2/2001 | Hiscock et al. | 370/360 |
| 6,199,172 B1 | 3/2001 | Dube et al. | 714/4 |
| 6,205,488 B1 | 3/2001 | Casey et al. | 709/238 |
| 6,205,563 B1 | 3/2001 | Lewis | |
| 6,208,649 B1 | 3/2001 | Kloth | |
| 6,216,168 B1 | 4/2001 | Dev et al. | 709/245 |
| 6,230,194 B1 | 5/2001 | Frailong et al. | |
| 6,233,623 B1 | 5/2001 | Jeffords et al. | 709/316 |
| 6,252,852 B1 | 6/2001 | Rowles et al. | |
| 6,296,330 B1 | 10/2001 | Hall | |
| 6,324,590 B1 | 11/2001 | Jeffords et al. | 709/316 |
| 6,338,092 B1 * | 1/2002 | Chao et al. | 709/236 |
| 6,345,239 B1 | 2/2002 | Bowman-Amuah | |
| 6,349,306 B1 | 2/2002 | Malik et al. | 707/103 |
| 6,377,987 B1 * | 4/2002 | Kracht | 709/220 |
| 6,392,667 B1 | 5/2002 | McKinnon et al. | 345/738 |
| 6,393,386 B1 * | 5/2002 | Zager et al. | 703/25 |
| 6,408,312 B1 * | 6/2002 | Forthman et al. | 707/203 |
| 6,421,719 B1 * | 7/2002 | Lewis et al. | 709/224 |
| 6,549,932 B1 * | 4/2003 | McNally et al. | 709/202 |
| 6,580,693 B1 | 6/2003 | Chernyak et al. | |
| 6,581,166 B1 | 6/2003 | Hirst et al. | |
| 6,604,208 B1 | 8/2003 | Gosselin et al. | |
| 6,654,914 B1 | 11/2003 | Kaffine et al. | |
| 6,694,314 B1 | 2/2004 | Sullivan et al. | |
| 6,876,993 B2 | 4/2005 | LaButte et al. | |
| 7,043,661 B2 | 5/2006 | Valadarsky et al. | |
| 7,103,807 B2 | 9/2006 | Bosa et al. | |
| 7,111,205 B1 | 9/2006 | Jahn et al. | |
| 2002/0133328 A1 | 9/2002 | Bowman-Amuah | |
| 2002/0133756 A1 | 9/2002 | Jain | |
| 2003/0069972 A1 | 4/2003 | Yoshimura et al. | |
| 2003/0149919 A1 | 8/2003 | Greenwald et al. | |
| 2004/0078683 A1 | 4/2004 | Buia et al. | |

OTHER PUBLICATIONS

Microsoft Computer Dictionary, 2002, Microsoft Press, Fifth Edition, p. 291.*
P. Traina, "Autonomous System Confederations for BGP", Jun. 1996, Network Working Group RFC 1965, pp. 1-8.*
C. Hedrick, "Routing Information Protocol", Jun. 1988, Network Working Group RFC 1058, pp. 1-34.*
J. Moy, "OSPF Version 2", Jul. 1997, Network Working Group RFC 2178, pp. 1-212.*
IEEE Computer Society, "ANSI/IEEE Std 802.1D, 1998 Edition, Part 3: Media Access Control (MAC) Bridges", 1998, IEEE Computer Society, pp. 1-373.*
Peregrine Systems Partners with Motive Communications to Offer IT Solutions that Enhance Employee Self-Service, 1999, Peregrine Systems, Inc., 4 pages.
International Search Report issued in PCT/US01/14767 dated Jul. 13, 2001.

* cited by examiner

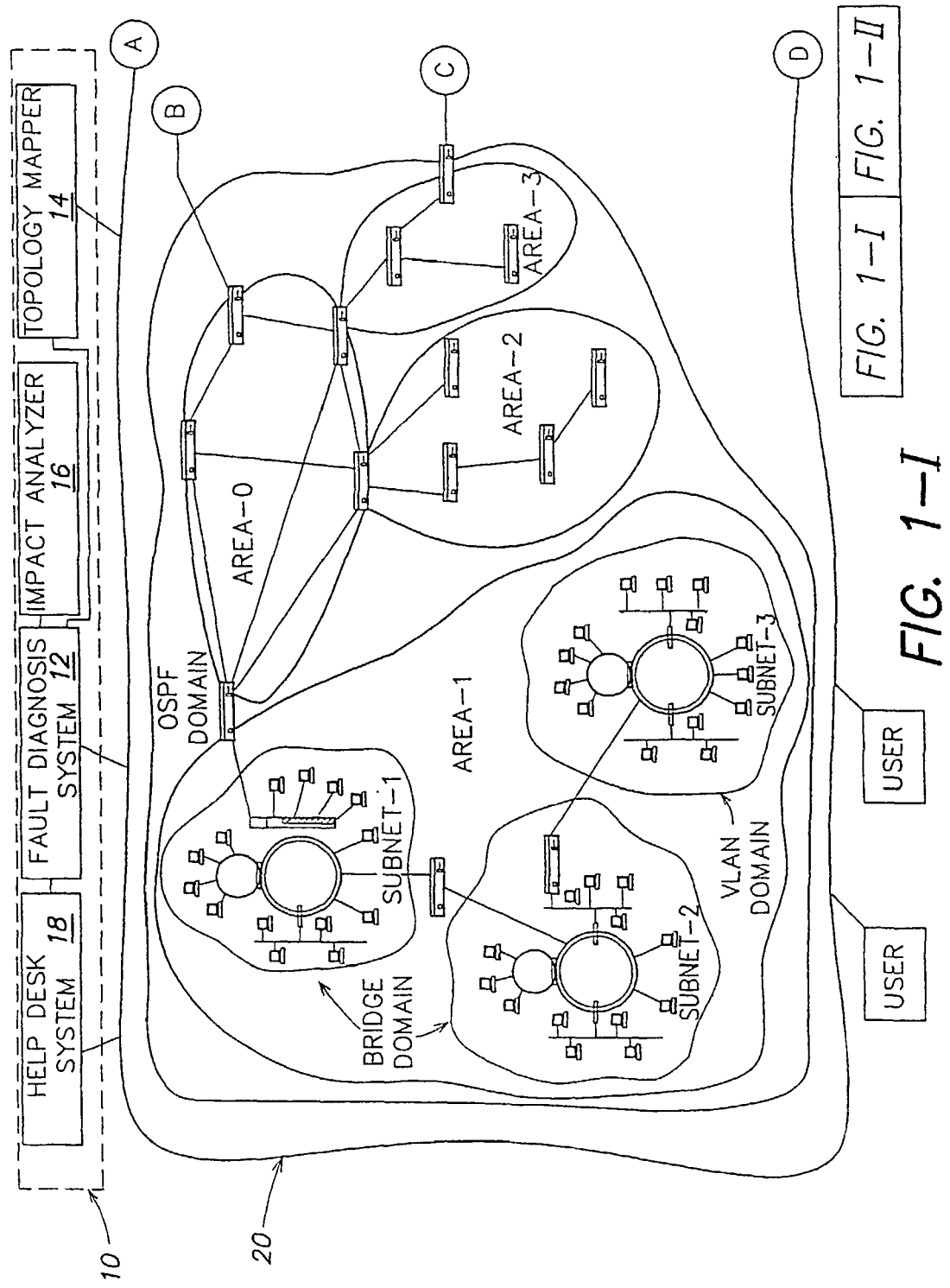

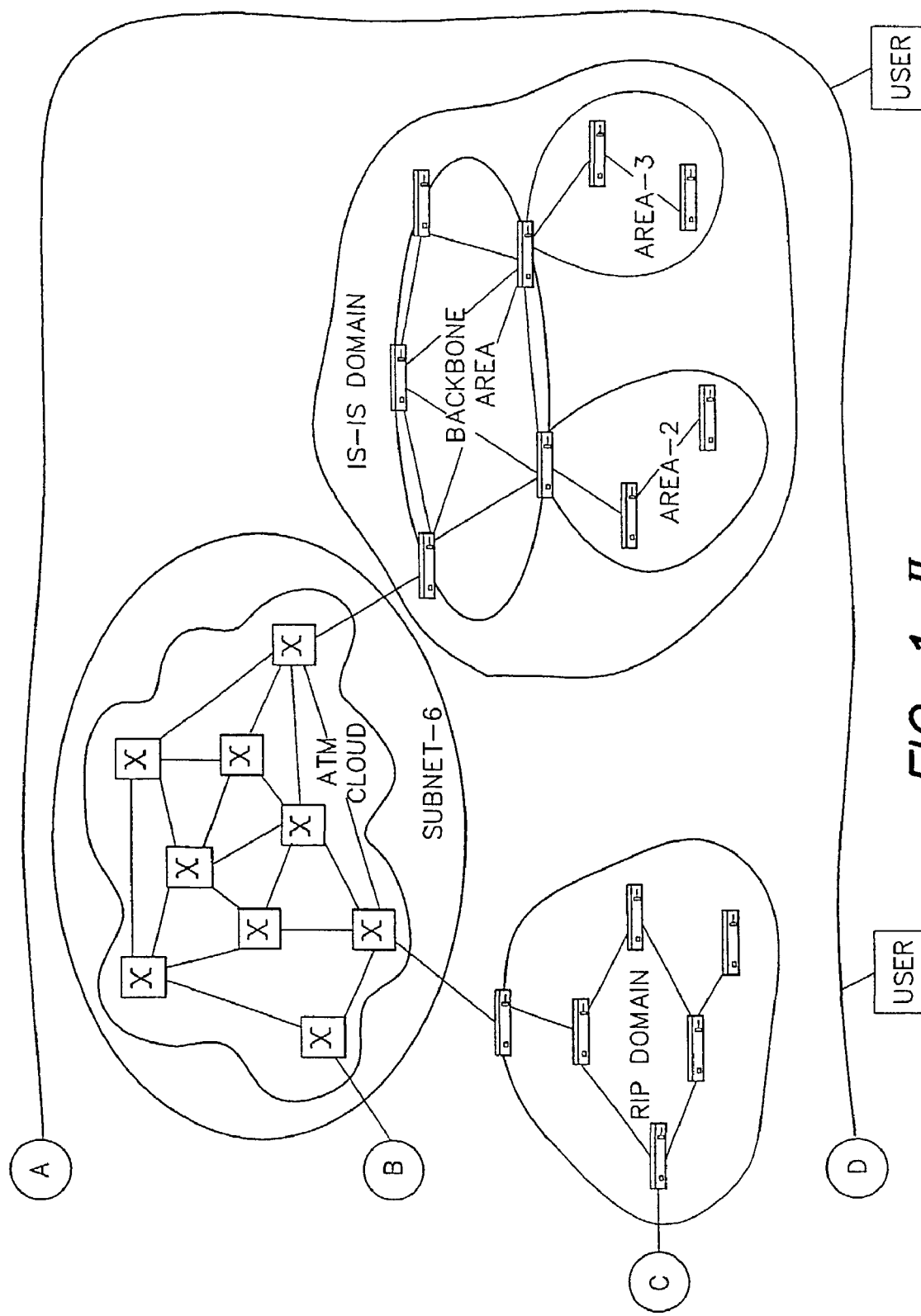
FIG. 1-II

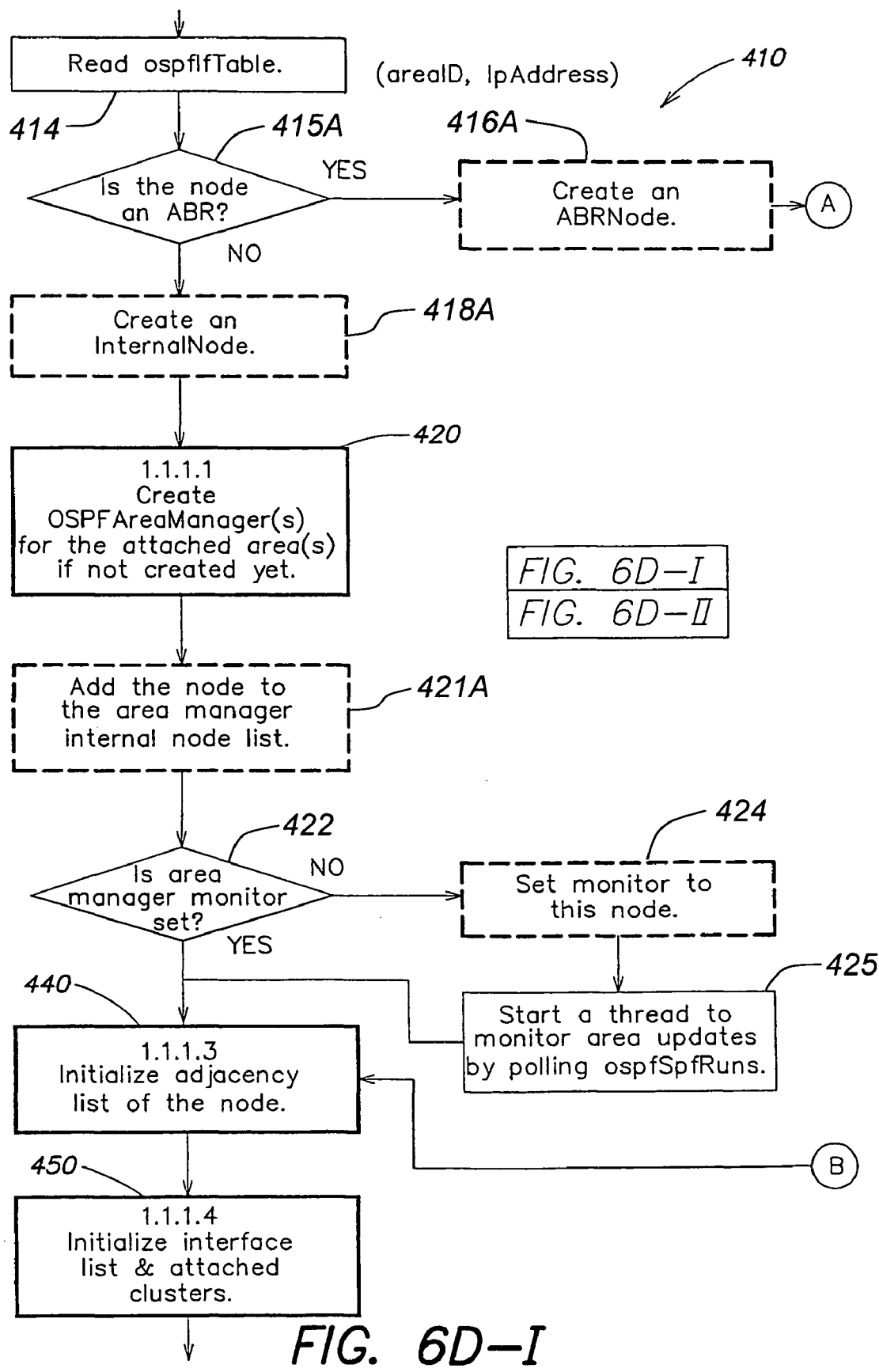
FIG. 6D-I

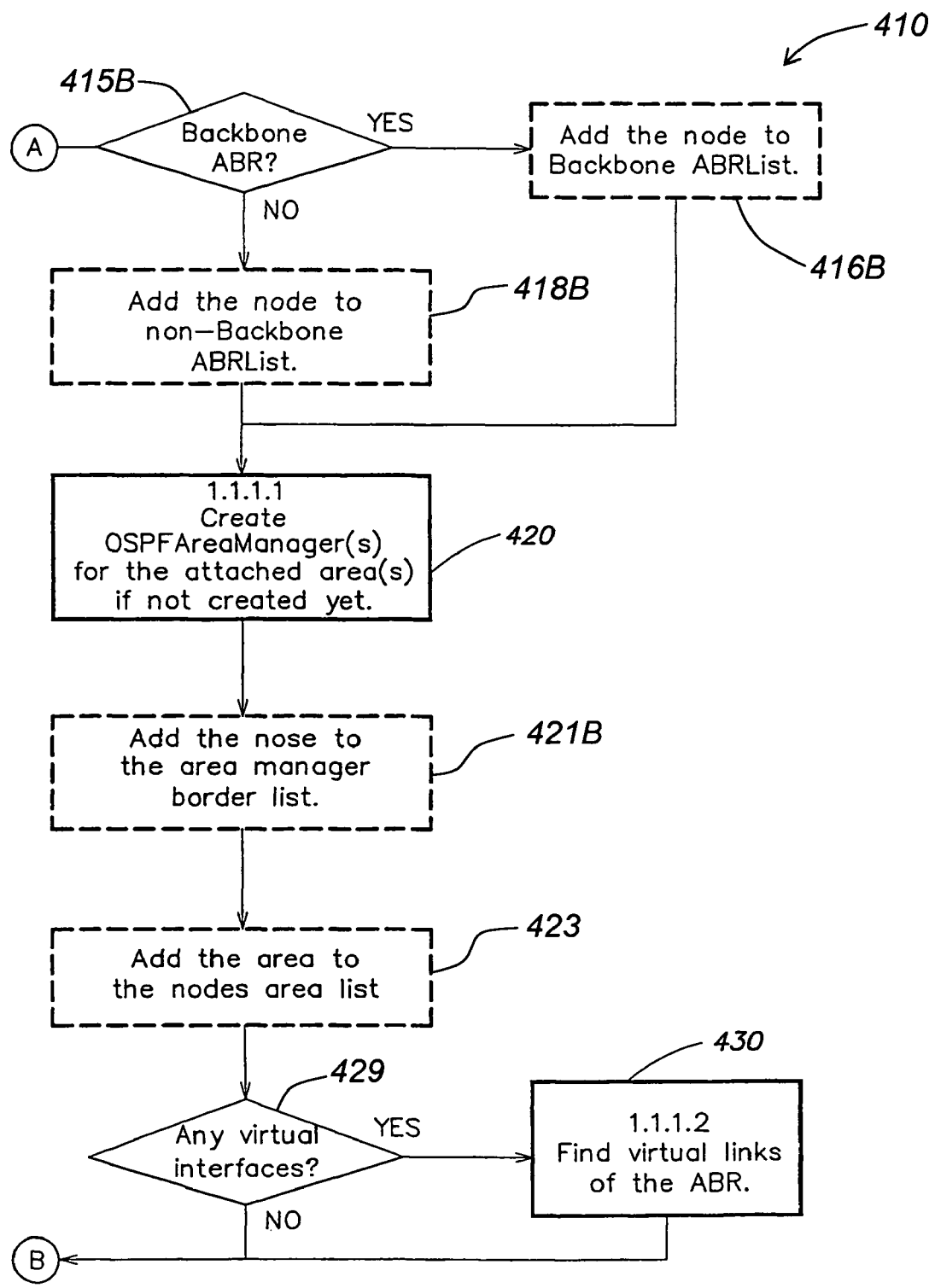
FIG. 6D-II

SYSTEMS AND METHODS FOR CONSTRUCTING MULTI-LAYER TOPOLOGICAL MODELS OF COMPUTER NETWORKS

This application claims priority from PCT Application PCT/US01/14767 which in turn claims priority from U.S. Provisional Application 60/202,296, entitled "Construction of a Very Rich, Multi-layer Topological Model of a Computer Network for Purposes of Fault Diagnosis," filed on May 5, 2000; and claims priority from U.S. Provisional Application 60/202,299, entitled "A method for diagnosing faults in large multilayered environments guided by path and dependency analysis of the modeled system," filed on May 5, 2000; and claims priority from U.S. Provisional Application 60/202, 298, filed on May 5, 2000, entitled "Method and apparatus for performing integrated computer network, system, and application fault management," all of which are incorporated by reference in their entireties.

GENERAL DESCRIPTION

The invention relates to determining topology of network elements in a communications network. The construction of computer networks started on a large scale in the 1970's. Computer networks link personal computers, workstations, servers, storage devices, printers and other devices. Historically, wide area computer networks (WANs) have enabled communications across large geographic areas, and local area networks (LANs) communications at individual locations. Both WANs and LANs have enabled sharing of network applications such as electronic mail, file transfer, host access and shared databases. Furthermore, WANs and LANs have enabled efficient transfer of information, and sharing of resources, which in turn increased user productivity. Clearly, communications networks have become vitally important for businesses and individuals.

Communications networks usually transmit digital data in frames or packets created according to predefined protocols that define their format. Data frames include headers (located at the beginning and containing addresses), footers (located at the end of the frames), and data fields that include the transmitted data bits (payload). Data frames may have a fixed or variable length according to the used protocol or network type.

A communications network transmits data from one end station (i.e., a computer, workstation, server etc.) to another using a hierarchy of protocol layers (i.e., layers that are hierarchically stacked). In the communication process, each layer in the source communicates with the corresponding layer in the destination in accordance with a protocol defining the rules of communication. This is actually achieved by transferring information down from one layer to another across the layer stack, transmitting across a communication medium, and then transferring information back up the successive protocol layers on the other end. To facilitate better understanding, however, one can visualize a protocol layer communicating with its counterparts at the same layer level.

The open system interconnection (OSI) model has seven layers that define the rules for transferring information between the stations. A physical layer (Layer 1) is responsible for the transmission of bit streams across a particular physical transmission medium. This layer involves a connection between two endpoints allowing electrical signals to be exchanged between them.

A data link layer (Layer 2) is responsible for moving information across a particular link by packaging raw bits into logically structured packets or frames. Layer 2 ensures good transmission and correct delivery by checking errors, re-transmitting as necessary, and attaching appropriate addresses to the data sent across a physical medium. If a destination computer does not send an acknowledgment of frame receipt, Layer 2 resends the frame. The contention access methods (e.g., CSMA/CD, and Token passing) are regarded as Layer 2 activities. Layer 2 may be further divided into two sub-layers: Logical Link Control (LLC) and Media Access Control (MAC). The MAC sublayer defines procedures the stations must follow to share the link and controls access to the transmission link in an orderly manner. The MAC sublayer defines a hardware or data link address called a MAC address. The MAC address is unique for each station so that multiple stations can share the same medium and still uniquely identify each other. The LLC sublayer manages communications between devices over a single link of the communications network.

A network layer (Layer 3) is set up to route data from one network user to another. Layer 3 is responsible for establishing, maintaining, and terminating the network connection between two users and for transferring data along that connection. Layer 3 addresses, messages, and determines the route along the network from the source to the destination computer. Layer 3 manages traffic, such as switching, routing, and controlling the congestion of data transmissions.

A transport layer (Layer 4) is responsible for providing data transfer between two users at an agreed level of quality. When a connection is established, this layer is responsible for selecting a particular quality of service (QoS), for monitoring transmissions to ensure the selected QoS, and for notifying the users if the QoS deteriorates. Layer 4 also provides for error recognition and recovery, repackaging of long messages into smaller frames of information, and acknowledgments of receipt.

A session layer (Layer 5) focuses on providing services used to organize communication and synchronize the dialog that takes place between users and to manage the data exchange. The primary concern of Layer 5 is controlling when users can send and receive concurrently or alternately. A presentation layer (Layer 6) is responsible for the presentation of information in a way that is meaningful to network users. This may include character code transmission, data conversion, or data compression and expansion.

Layer 6 translates data from both Layer 5 and from Layer 7 into an intermediate format and provides data encryption and compression services. Layer 7 is an application layer that provides means for application processes to access the system interconnection facilities in order to exchange information. This includes services used to establish and terminate the connections between users and to monitor and manage the systems being interconnected, as well as the various resources they employ.

As data is passed down through the layers, each layer may or may not add protocol information to the data, for example, by encapsulating frames with a header or removing the header, depending on the direction in the protocol stack. The individual protocols define the format of the headers.

MAC address includes a source address and a destination address, which have a predefined relationship to a network station. Higher network layers provide a network address that has a logical relationship established by a network administrator according to a predetermined network addressing arrangement. The assigned network address conveys information that can be used by a router when routing frames through the internetwork. If the network address is hierarchical, a router may use a portion of the address to route the packet to a higher-level partition or domain in the internetwork. Some protocols are hierarchical others are not so hierarchical routing may or may not be available.

The global network may be subdivided into IP networks, which in turn may be subdivided into subnets. An IP address includes a network number (assigned by IANA), a subnet number (assigned by a network administrator), and a host that identifies an end station. The host number may be assigned by a network administrator, or may be assigned dynamically. This is a form of hierarchical addressing that is used by IP routing algorithms to perform hierarchical or prefix routing operations. Routing algorithms maintain information of all higher-level routing environments in routing tables for domains by recording their shortest unique address prefixes.

A station may support more than one network layer protocol. Such station has multiple network addresses and multiple protocol stacks that present the same MAC address on a port for the different protocols. Thus, a multi-protocol stack station connected to both an IP and an IPX network includes an IP network address and an IPX network address.

A communications network may include a number of network entities (or nodes), a number of interconnecting links and communication devices. A network node is, for example, a personal computer, a network printer, file server or the like. An interconnecting link is, for example, an Ethernet, Token-Ring or other type network link. Communication devices include routers, switches, bridges or their equivalents. As computer networks have grown-in size, network management systems that facilitate the management of network entities, communication links and communication devices have become necessary tools for a network administrator.

A bridge or a switch is a Layer 2 entity that is typically a computer with a plurality of ports for establishing connections to other entities. The bridging function includes receiving data from a port and transferring that data to other ports for receipt by other entities. A bridge moves data frames from one port to another using the end-station MAC address information contained in the switched frames. Switches interconnect the communication media to form small domains of stations, such as a subnetwork. Subnetworks or subnets provide an organizational overlay to an internetwork that facilitates transmission of data between the end stations, particularly for broadcast transmissions. The subnet functions to limit the proliferation of broadcast frames to stations within a broadcast domain.

A router is an intermediate station that interconnects domains or subnets by providing path from a node on a first network to a node on a second network. There are single protocol or multi-protocol routers, central or peripheral routers, and LAN or WAN routers. A peripheral router connects a network to a larger internetwork, and thus may be limited to a single protocol. A central router may be connected to a different board in a server or a hub and thus usually has a multi-protocol capability.

A router provides the path by first determining a route and then providing an initial connection for the path. A router executes network routing software that depends on the used protocol. A router can work with different data-link layer protocols and thus can connect networks using different architectures, for example, Ethernet to Token Ring to FDDI. Furthermore, there are routers of several levels, wherein, for example, a subnetwork router can communicate with a network router. Organizing a communications network into levels simplifies the routing tasks since a router needs to find only the level it must deal with. The use of different network levels is shown in FIG. 1.

In general, a global communications network connects devices separated by hundreds of kilometers. A LAN covers a limited area of maximum several kilometers in radius connecting devices in the same building or in a group of buildings. LANs usually include bridges or switches connecting several end-stations and a server. In a LAN, a bridge or a switch broadcasts traffic to all stations. Until a few years ago, a LAN was user-owned (did not run over leased lines) with gateways to public or other private networks. When a user moved or changed to an end-station at another location on the network, a network administrator had to rewire and reconfigure the user's station. This has changed with the introduction of virtual LANs.

A virtual LAN (VLAN) is a logical Layer 2 broadcast domain, which enables a logical segmentation of the network without changing the physical connections. A VLAN enabled switch segments the connected stations into logically defined groups. Broadcast traffic from a server or an end-stations in a particular VLAN is replicated only on those ports connected to end-stations belonging to that VLAN. The broadcast traffic is blocked from ports with no end-points belonging to that VLAN, creating a similar type of broadcast containment that routers provide. VLANs may also be defined between different domains connected by a router. In this case, the router passes network traffic from one domain to the other (as done without defining a VLAN), and passes network traffic from one VLAN to the other. The router also passes network traffic between VLANs that are in the same domain because VLANs do not normally share user information. The router is configured as a member of all VLANs.

There are several VLAN implementations and several methods used to determine VLAN membership. These methods include defining the membership by port, by MAC address, by protocol, by IP multicast address, by policy, or a combination of these methods. For port-based VLANs, IEEE 802.1Q defines an industry standard implementation. A large number of physical ports of a switch may be associated with a number of groups within the switch using a VLAN arrangement. This arrangement associates a port with a particular VLAN designation.

The VLAN designation is assigned (e.g., programmed) to each internal port and is stored in a memory portion of the switch. Every time a message is received by a switch on an internal port, the VLAN designation of that port is associated with the message.

Several switches can be interconnected to extend the VLAN port associations in the internetwork. This VLAN arrangement allows exchange of messages between all ports and entities of the network having the same VLAN designation by associating a VLAN designation with each message. This way the entities with the same VLAN designation operate as if they are all part of the same LAN. Each VLAN may be further associated with a subnet or broadcast domain so as to constrain broadcasting of frame messages to a defined subset of stations.

Virtual Private Networks (VPNs) have been designed to interconnect end-stations that are geographically dispersed. For example, owners of large communications networks can provide centralized management services to small and medium sized businesses. The provider can configure VPNs that interconnect various customer sites in geographically separate locations. These VPNs offer privacy and cost efficiency through sharing of network infrastructure. Various VPNs have been proposed with various degrees of security, privacy, scalability, ease of deployment and manageability.

A global communications network may use a different levels different routing and connection management protocols such as International Standards Organization (ISO) Open Systems Interface (OSI) Intermediate Systems to Intermediate Systems (IS-IS), and Internet Open Shortest Path First (OSPF) protocols are used for connectionless routing of data frames. Asynchronous Transfer Mode (ATM) Forum Private Network-Network-Interface (PNNI) protocol is used for connection oriented multi-media services. The routing protocols identify a network node using a global address of a Route Server Element (RSE). The RSEs generate routing that identify optimal routes for communication throughout the network. The RSE is responsible for administration of the algorithms that enable a node to keep its view of the network topology and performance metric current, referred to as Routing Information Exchange (RIE). Thus an RSE usually acts as a central element for the routing of traffic through the node.

The Internet Protocol (IP) divides networks into autonomous systems (AS) with routing areas and area subnets. The area sub-nets form adjacencies and flooding of link state information. The OSPF link state protocol provides for dynamically auto-configurating the AS topology and for forwarding data frames received from adjacent nodes. The link states are propagated depending on the location and designation of the routers which maintain routing tables and forward data frames. The protocol defines four types of routers, that is, an internal, border, backbone and boundary router. The border, backbone and boundary routers advertise summary route information and internal routers advertise complete link state information within an area. An optimal routing policy such as SPF can be used for routing within an AS. Each router node therefore maintains a topology database, a routing table and a forwarding capability. A Type of Service (TOS) field in the IP packets may be used to create routes based on QOS requirements such as delay, throughput and reliability. All OSPF protocol exchanges are authenticated.

The OSI Intra-Domain Routing Information Exchange protocol provides for routing domains composed of areas within which detailed routing information is maintained within individual network elements called Intermediate Systems (IS). The IS can dynamically auto-configure the area topology and forward protocol data units (PDU) received from adjacent nodes (i.e., neighbors). Each node develops a routing table, which allows PDUs to be forwarded based on some optimal policy (e.g., the SPF algorithm). An IS uses a "flooding" scheme to exchange authenticated link states throughout an area. In a flooding scheme, when an IS receives a PDU it automatically copies the PDU to all adjacent nodes. This way the PDU propagates throughout the network. Link states carry addressing and quality of service (QOS) information. Routing between areas is accomplished using Level 2 intermediate system. Level 2 intermediate systems use area addresses to route a data frame according to SPF (or another policy) to the nearest Level 2 intermediate system, which in turn forwards the frame within the destination routing area.

ATM Forum PNNI protocols describe both routing and signaling in an integral scheme carrying of both connection oriented and connectionless traffic. PNNI accommodates large networks by forming multiple levels of hierarchy. At the lowest level, PNNI uses peer groups that are a collection of logical nodes that exchange information with other members of the group. Peer groups communicate by the use of Hello-protocols and flooding of link states. Logical peer groups are then formed to communicate between peer groups. This organization is accomplished by selecting peer group and logical peer group leaders which form overlay networks for the distribution of summary routing information at different levels. Members of the same peer group maintain an identical view of the PG, and nodes outside of the PG exchange messages with the PG as a whole. PNNI also provides for signaling to establish routes between a source and a destination. The created routes may be based on QoS criteria as defined by User Network Interface (UNI) traffic management specifications. The QoS criteria include parameters such as available bit rate (ABR), maximum supported bit rate (MBR), likely variability in end-to-end delay for ATM cells, and cell loss ratio with cell loss priority. The QoS routing is required for applications with real-time requirements and scalability to large global networks. PNNI makes no assumption about an optimal routing algorithm, such as SPF. Optimal routing is left to Implementation. The protocol is capable of responding to changes in traffic patterns in the form of dynamic routing of traffic. These features and the reachability of information, also inherent in the routing database, enables efficient routing decisions for carrying connection-oriented and connectionless traffic. PNNI provides large-scale networks with a single routing protocol, unlike the Internet strategy of using a number of protocols at various levels.

In general, the use of WANs, LANS, VPNS, and VLANs has increased the number and complexity of communications networks. These networks continuously evolve and change due to growth and introduction of new interconnections, topologies, protocols, or applications. Furthermore, most networks have redundant communication paths to prevent portions of the network from being isolated due to link failures. Also, multiple paths can be used simultaneously to load-balance data between the paths. However, redundant paths can also introduce problems such as formation of loops. Furthermore, network performance can degrade due to improper network configurations, inefficient or incorrect routing, redundant network traffic or other problems. Network hardware and software systems may also contain design flaws that affect network performance or limit access by users to certain of the resources on the network. These factors make network management complex and difficult.

A network management process controls and optimizes the efficiency and productivity of a communications network. A network management station manages the network entities (e.g., routers bridges switches, servers, storage devices, computers, printers) using a network management protocol such as a Simple Network Management Protocol (SNMP), Internet Control Message Protocol (ICMP), or another network management protocol known in the art. Using a network management protocol, the network management station can deliver information or receive information by actively polling the network entities or by receiving unsolicited information from the network entities. Using SNMP, a network management station can executes a set, get, or get-next functions to sett and retrieve information from a network entity. This information may be stored within the polled network entity as Management Information Base (MIB). The network management station can receive unsolicited information from a network entity in the form of an SNMP trap. Network entities may send SNMP traps to the network management station when a problem in the network or network entity occurs.

A network management station may be implemented using any general purpose computer system, which is programmable using a high-level computer programming language or using specially programmed, special purpose hardware. The hardware includes a processor executing an operating system providing a platform for computer programs that run scheduling, debugging, input-output control, accounting compilation, storage assignment, data management, memory management, and communication control and other services. The application programs are written in high level programming languages.

A network management station can include a network manager unit, a network communication interface, a data acquisition unit, a data correlation unit, and a graphical user interface. The data correlation unit interprets data received through the data acquisition unit and presents the interpreted data to a user on the graphical user interface.

The network communication interface may include transport protocols and LAN drivers used to communicate information to the communications network. The transport protocols may be IPX, TCP/IP or other well-known transport protocols. The LAN drivers may include software required to transmit data on a communications network through the network interface. The LAN drivers are generally provided by the manufacturer of the network interface for a general purpose computer for the purpose of communicating through the network interface. The network manager unit may be an SNMP network manager/agent implementing SNMP functions, or another type of network manager unit performing associated management functions. The network manager unit utilizes the network communication interface to transfer requests to network entities over a communications network.

A network management station may use a network management agent residing on a network entity. The network management agent may be a software process running on a processor or may be special purpose hardware. The network management agent may be an SNMP agent (or ICMP agent?), which may include a data collection unit, a network manager unit, and a network communication interface for communication as described above. For example, this communication may use network management functions such as SNMP functions. Alternatively, a network management agent, residing on a network entity, may include a data correlation unit, a data collection unit, a network manager unit and a network communication interface for communication.

SUMMARY OF THE INVENTION

The present invention is a system, a method and a product (that can be stored in a computer-readable storage medium) for determining topology of a communications network or determining topology of a part of the network. The system and method provide a modular framework that can be integrated with a fault diagnoser, an impact analyzer, a help desk system or any other module of a network management system.

According to one aspect, a system and method for determining topology of a part of a communications network include a topology mapper. The topology mapper includes discovery module, a memory, and a presentation module. The discovery module is constructed and arranged to discover network elements in a communications network. The memory constructed and arranged to store topology data received from the discovery module. The presentation module constructed and arranged to present data related to topology of the communication network.

According to another aspect, network mapping means includes means for discovering network elements in a communications network, means for storing topology data received from the discovery module, and means for presenting data related to topology of the communication network.

Preferred embodiments of these aspect may include one or more of the following:

The discovery module is further constructed to determine logical dependencies between network layers of the communications network. The discovery module is further constructed and arranged to determine dependencies between an application and a system in the communication network. The discovery module is further constructed to determine topological change in the network element.

The topology mapper may include a data log constructed and arranged to store information related over time to the function of the discovery module. The presentation module is constructed and arranged to display historical topology data and current topology data. The presentation module is constructed and arranged to display current topology data and intended topology data. The presentation module is constructed and arranged to display the topology data in a multi-layer format.

The topology mapper is constructed and arranged to display interdependencies among elements of two of the network layers. The topology mapper is constructed and arranged to display topological change for the purposes of historical reconstruction.

According to yet another aspect, a network management system including a topology mapper. The topology mapper includes discovery module, a memory, and a presentation module. The discovery module is constructed and arranged to discover network elements in a communications network. The memory constructed and arranged to store topology data received from the discovery module. The presentation module constructed and arranged to present data related to topology of the communication network.

Advantageously, one or several embodiments of the present system and method reduce impact on the network during periods of topology determination and maintenance. They provide for logging of elements of topological change for purposes of 'scene' recreation during phases of historical and intermittent fault diagnosis. These embodiments enable robust handling of unmodeled elements of a topology and correct association within the topological landscape such that a topologically centric fault diagnosis system can accurately and effectively perform a root cause analysis.

Furthermore, some embodiments of the present system and method enable the use of other forms of empirical and inferred network data results in a complete and accurate representation of the topology. They capture logical dependencies between network layers and those between application and systems with the network. This allows a topologically centric fault diagnosis system to accurately and effectively perform its designed task. The modeling of intent gives the user of a topologically centric fault diagnosis system a process for dealing with network redundancy and topological change.

Preferably, some embodiments of the present system and method enable maintenance of a topology that is historical in nature, maintenance of a topology that captures design and management intentions, and maintenance of three separate topologies, i.e., a current, historical and design intent topology.

Preferably, some embodiments of the present system and method also enable maintenance of a rich multi-layer topology that incorporates multiple network layers within a single topological model; and representation of interdependencies amongst elements of different network layers. Some embodiments of the present system and method also enable presentation of the concept of separation of application, system and network 'space'; mapping of interdependencies between applications, systems and network entities. These embodiments use the concept of handling topology with compartmentalization.

Preferably, some embodiments of the present system and method also enable reduction of the network traffic impact through utilization of tactical monitoring for topology change; enable data gathering by multiple means, specifically by knowledge of known support by topological entity in question; enable both logging topological changes for the purpose of historical reconstruction and logging type of topological change with specialized records; and enable finding proper location within the modeled topology of a previously unmodeled, but addressable entity.

BRIEF DESCRIPTION OF THE DRAWINGS

FIG. 1 shows diagrammatically several network management modules connectable to a communications network.

FIGS. 6B through 6K are flow diagrams that illustrate an algorithm for finding an OSPF network such as the network shown in FIG. 6.

DESCRIPTION OF PREFERRED EMBODIMENTS

Figure 2:
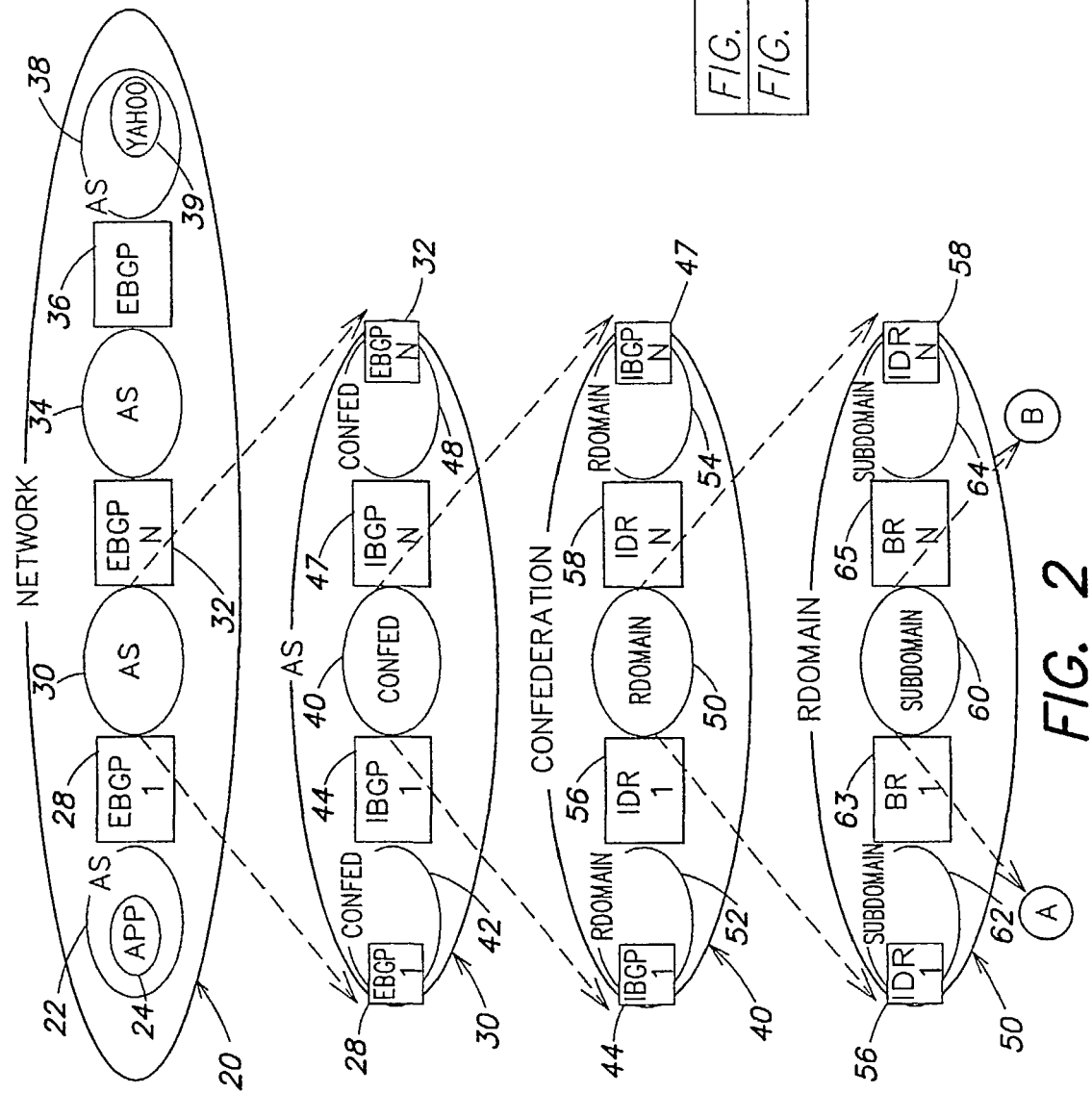
FIGS. 2 and 2A show diagrammatically hierarchical architecture of the communications network of FIG. 1.

FIG. 1 shows diagrammatically a network management system 10 including a fault diagnosis engine 12, a topology mapper 14, an impact analyzer 16 and a help desk system 18. The network management system communicates with a communications network 20 (or application service). The network includes a set of interconnected network elements such as routers, bridges, switches, and repeaters. These network elements provide transportation of data between end stations. Furthermore, there are computers known as servers that provide services such as e-mail, accounting software, sales tools, etc. Typically, data is transmitted electronically or optically, and network elements can forward data in packets, frames or cells to the intended destination. Servers include network adapters and/or software that interpret the electronic or optical data packet into the data elements and pass these elements to the appropriate application being hosted.

The network management system 10 includes a commercially available processor (for example, PENTIUM® microprocessor manufactured by Intel Corporation) executing an operating system providing an operating environment for a network management program. The processor and the operating system provide a computer platform for which application programs are written in higher level programming languages. The computer (or application host) interfaces with permanent data storage, such as a magnetic or optical disk drive, a disk array, non-volatile RAM disk, or a storage area network, which maintain data files such as user configurations and policies. In general, the network management program may be configured as a generic software application residing in any commercially available computing platform.

Preferably, fault diagnosis engine 12, topology mapper 14, and help desk system 18 are software applications written in Java programming language and running on any computer with a Java Runtime Environment (JRE). For example, a DELL™ laptop computer with an INTEL® PENTIUM® processor running the WINDOWS® 2000 operating system, or a SUN™ ULTRA™ 60 computer running SOLARIS™ v. 2.7. Alternatively, fault diagnosis engine 12, topology mapper 14, and help desk system 18 are developed in any object oriented or structured programming language, and compiled for execution on any one of many computer platforms, or could be implemented on a neural network computing device.

The computer has a network adaptor that provides communication (preferably, but not necessarily, IP) to the users on the network. The fault diagnosis engine application may share a host with help desk system, and/or the topology mapper, or each can run on a separate host, in which case they communicate using a network adaptor. Topology mapper 14 determines the network topology and creates a model. The permanent data storage holds data files that describe the current network topology, and configuration files that control the performance of topology mapper 14. A user is an end station, interfaced to access the network or services, used by a person who is using the network, or is using services provided by the network.

The topology mapper 14 services topology requests from a fault diagnosis engine 12. In order to determine the root cause of reported communication faults, the fault diagnosis engine needs certain topology information, either current or at some point in history. For example, the fault diagnosis engine may request the Layer-3 data path from one network element to another, as the network existed at a certain time yesterday afternoon. Additionally, the fault diagnosis engine may request information about the intent of the topology. By maintaining a versioned set of connection models that represents network changes and network intention (FIG. 8B), the invention can provide this needed information.

Figure 2A:
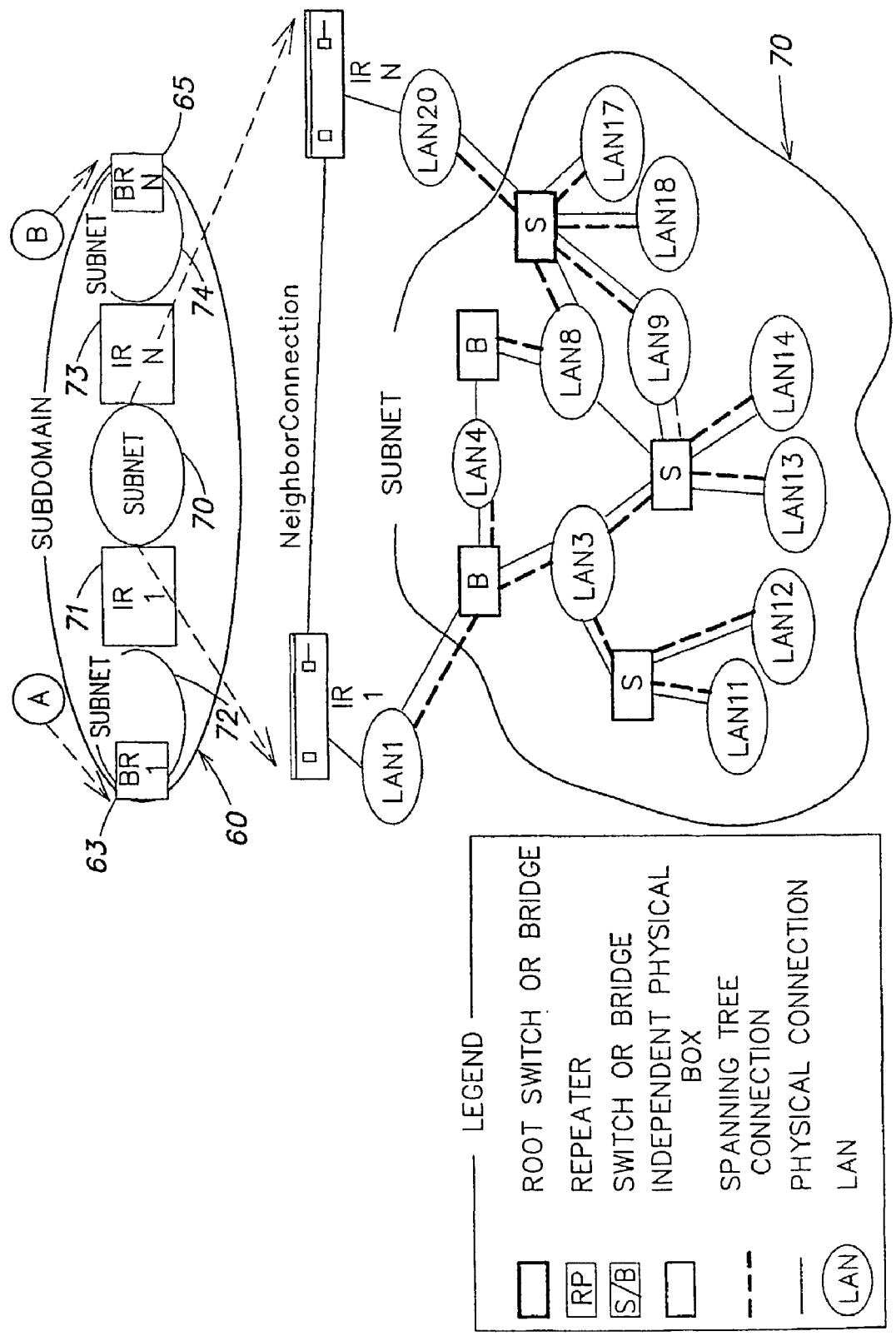

FIGS. 2 and 2A show diagrammatically a hierarchical architecture of the communications network shown in FIG. 1. The individual layers are physical and logical abstractions. A typical global network 20 (the Internet) is a collection of network devices collaborating together to transmit data. The network devices are logically organized and grouped to allow standard network data forwarding protocols to be used to determine data paths through the network. Additionally, certain devices are deemed "border" devices since they transmit data from one logical grouping to another. Referring to global network 20 in FIG. 2, a person sitting at a PC uses a web browser application 24 within an autonomous system (AS) 22. Application 24 requests a web page from a Yahoo! web server 39 located in an AS 38. Modeling of the actual network provides a very rich multi-layer, accurate representation of the network, which a fault diagnosis process can use to diagnose faults.

Internet service providers and telecommunications companies like AT&T, MCI, and Sprint provide and maintain autonomous systems 22,30,34,38, communicating by network routers 28,32 and 36. Routers 28,32 and 36 are organized into logical administrative groupings. The most common protocol used at this level is the BGP (Border Gateway Protocol). Routers 28,32 and 36 use an External BGP protocol to organize router information, and are located at borders of the Autonomous Systems.

At the AS level 30, network routers 44 and 47 are again administratively organized into logical groupings called confederations. Routers 44 and 47 use an Internal BGP protocol to organize route information and form the borders of the confederations 40,42, and 48. If all the routers are using the same interior gateway protocol and are centrally located and administered, the AS 30 may not have distinct confederations 40,42 and 48, but may function as both a confederation and an AS.

At the confederation level 40, one of many specific interior gateway routing protocols is used to determine routing information for data packets. The use of a given interior gateway routing protocol is confined to a single routing domain 50. The routing protocols include, but are not limited to, OSPF, RIP, and IS-IS. At routing domain level 50, border routers 56 and 58 are called Inter-Domain Routers since they have the ability to transmit data between distinct routing domains even if the domains use different interior gateway routing protocols. Within a particular interior gateway protocol, border routers may be treated as if they were AS border routers.

Within routing domain 50, a single interior gateway routing protocol is used. If the domain is large enough and the selected protocol supports sub-domains, routing domain 50 may be further broken up into sub-domains 60,62 and 64. OSPF may be used as the interior gateway protocol inside routing domain 50. OSPF allows network administrators to organize a network into yet-smaller administrative groupings, i.e., sub-domains 60, 62 and 64, called Areas. Border routers 63 and 65 at this level are called Area Border Routers, and use the OSPF protocol to determine how to transmit data between OSPF Areas 60, 62 and 64.

Inside an OSPF Area, interior routers use the OSPF protocol to determine the data paths. This is the final logical grouping, which uses routers as its data transport mechanism. IP-based subnets 70,72 and 74 are typically defined as the sub-regions inside an OSPF Area. IP subnets 70,72 and 74 define a common IP addressing space for devices inside the subnet.

At the subnet level 70, data is transmitted from router to router via Layer-2 bridges and switches. Typically, the subnet topology is highly redundant, with numerous physical connections between the bridges and switches. Layer-2 protocol (usually Spanning Tree) is used to determine the single path data will travel between bridges. Only one path will exist between any two devices inside a Subnet in which Spanning Tree is used.

Topology mapper 14 runs topology mapper algorithms for discovering and modeling of a single aspect (or set of layers) of the generic model. As the characteristics or capabilities of each network device become known to mapper 14, an appropriate algorithm is executed. A BGP algorithm described in connection with FIG. 4, attempts to discover and model the network at global network level 20, autonomous system level 30, and confederation levels 40. OSPF and RIP algorithms, described in connection with FIGS. 5 and 6, discover and model the network at the Routing Domain, and Sub Domain levels.

Figure 3:
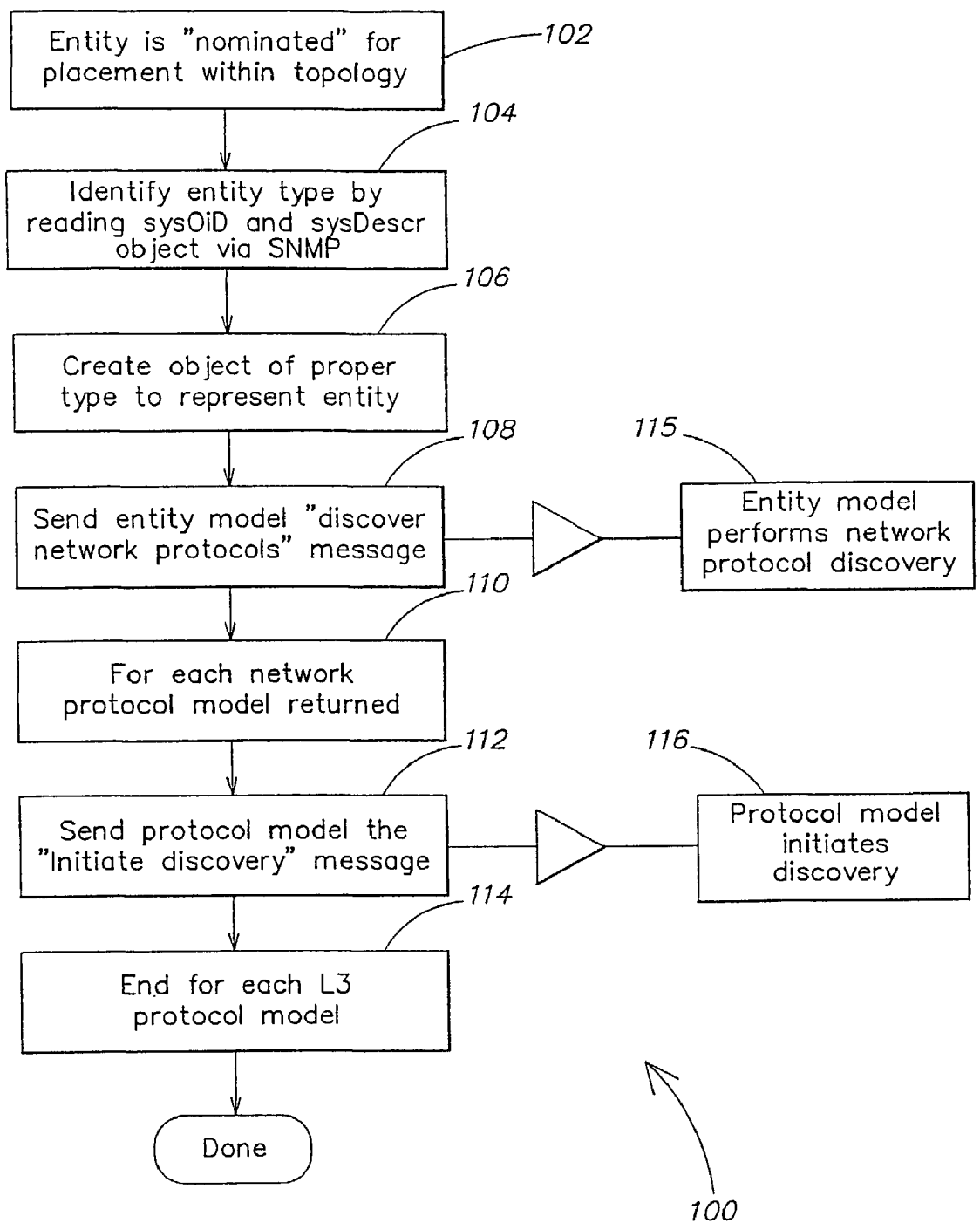
FIGS. 3 and 3A show a high level flow diagram of a topology mapping process.
Figure 3A:
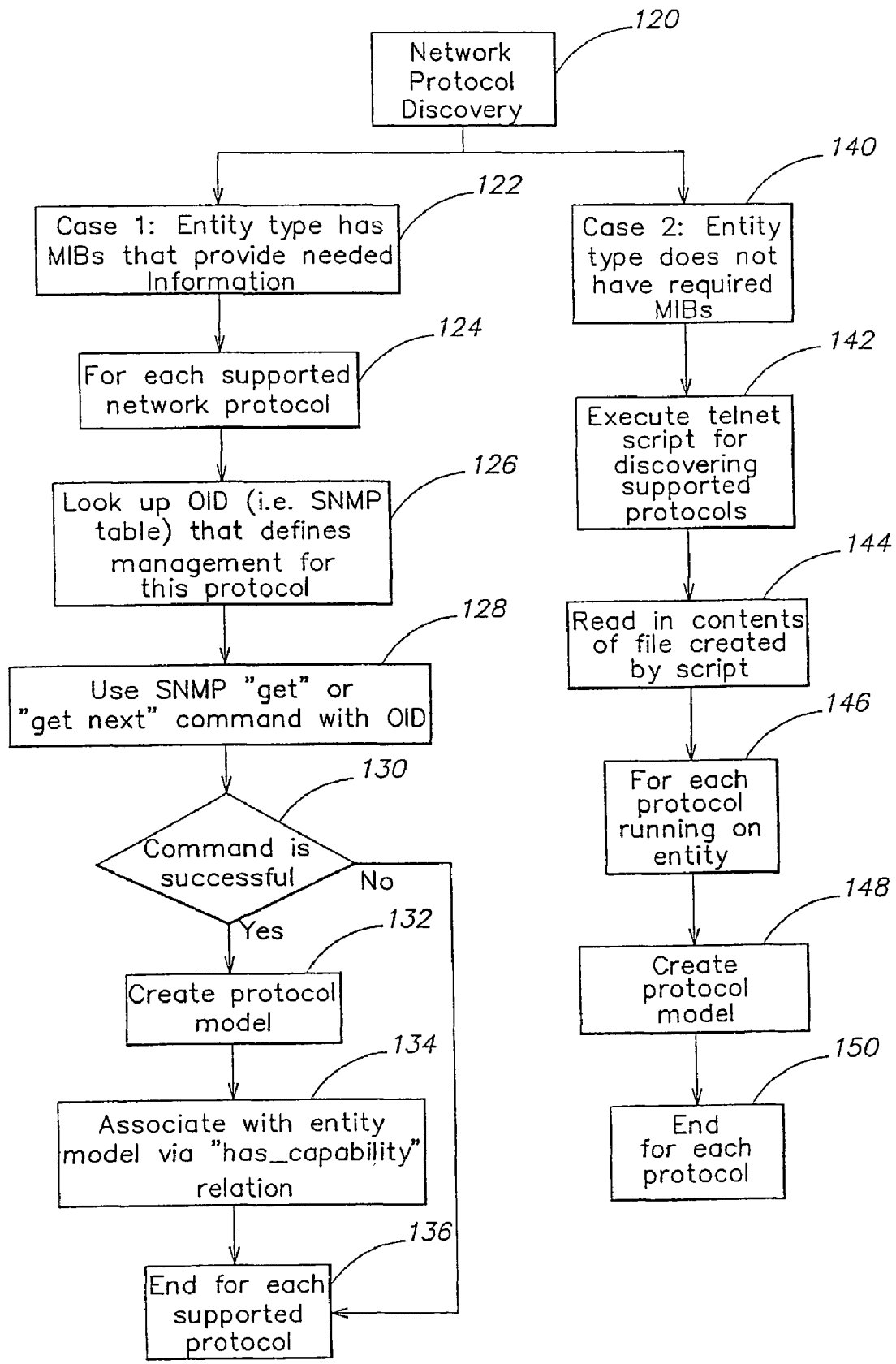

FIGS. 3 and 3A show a high level flow diagram of a topology mapping process. A process 100 is initiated when a user provides or modifies a set of IP address ranges and/or a set of "seed" router IP addresses. A "seed" router is merely a router that is used to initiate discovery. Each IP address in the ranges is sent SNMP commands requesting sysOID and sysDescr objects in the MIB-II System Group (described in technical standard RFC1213). In step 102, an entity is "nominated" for placement within topology by a "ping sweep" of an IP address range, or by discovering peers and connections of a (previously nominated) adjacent entity. Step 102 identifies entity type by reading sysOID and sysDesor object via SNMP protocol. Step 104 creates an object of proper type to represent the entity. In steps 110 to 114, the type of model created depends on the sysOID and sysDescr. In this way, a specific model type is created for a CISCO® 7500 router, or a NORTEL™ 5500 switch, for example.

If an entity does not have sufficient MIB support in steps 140 through 150, a telnet script is executed to mine the necessary information from the entity. Alternatively, a combination of SNMP gets and telnet scripts can be used to accomplish this task. It is certainly possible to use CMIP or HTTP or other protocols to mine the information.

In response to the "discover network protocols" message (step 108), the entity model will return a set of protocol models (step 115). Each protocol is sent the "initiate discovery" message (step 112). Each protocol type responds uniquely to the "initiate discovery" message. This message actually initiates various protocol discovery algorithms (step 116), and those algorithms will nominate other entities for discovery. That is, if a BGP4 protocol model is sent the "initiate discovery" message, the BGP4 modeling algorithm is initiated. Any BGP4 peers of this entity that are not already modeled will be nominated for discovery.

FIG. 3A illustrates network protocol discovery 120. The object-oriented methodology allows objects of different types to respond to messages differently which is known as polymorphism. The algorithm executes steps 122 through 136 if the entity type has MIBs that provide needed information. For each supported network protocol, in step 126, the algorithm looks up the OID that defines management for this protocol. The algorithm creates a protocol model (step 132) and associates it with entity model via the HasCapability relation (step 134). Referring to steps 140 through 150, a scripting language called "Expect" is used to create scripts to automate telnet sessions with network elements and parse out text elements. The interesting information parsed is stored in a simple file (either ASCII or XML) to create a protocol model (step 148).

Figure 4:
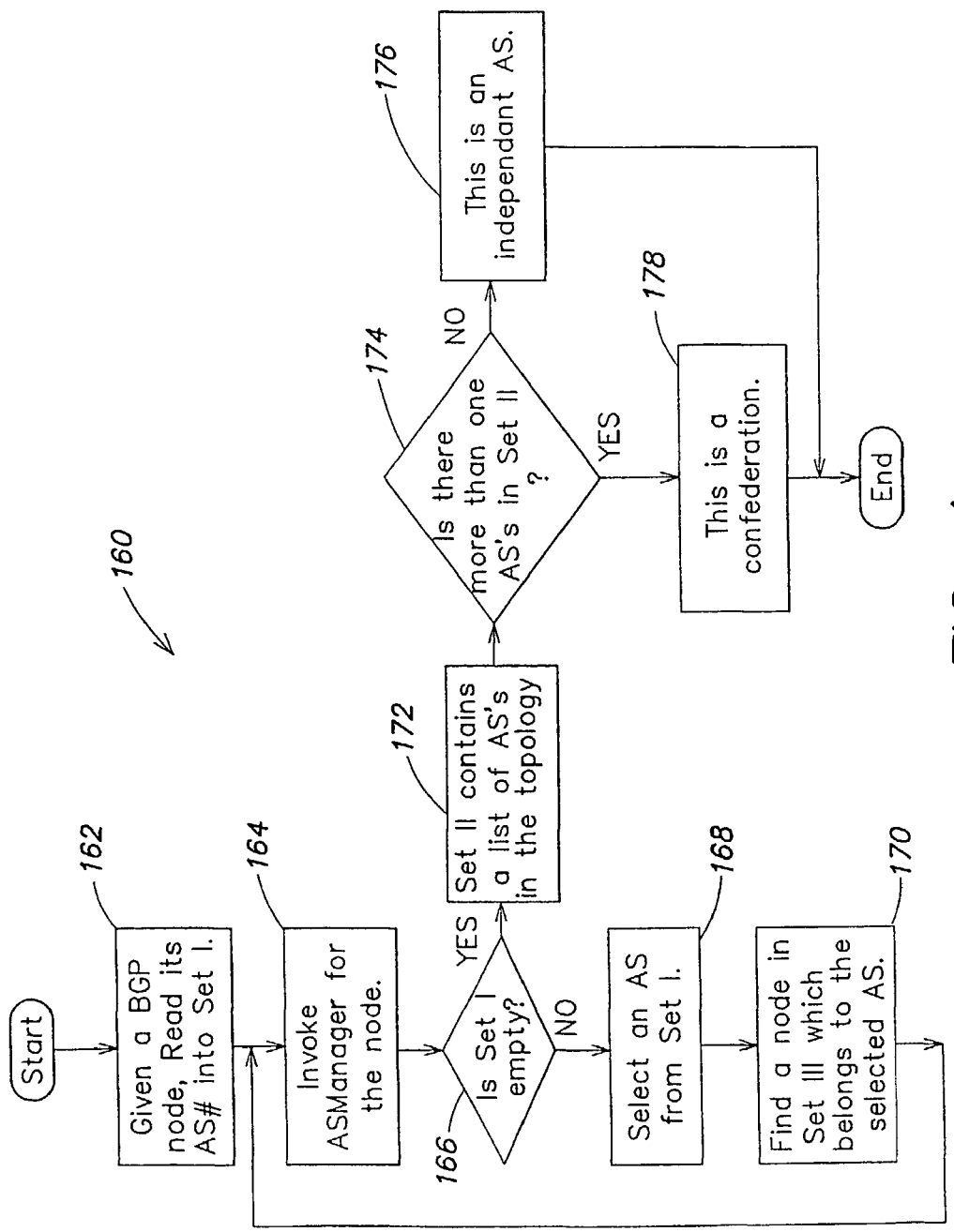
FIGS. 4, 4A, and 4B are flow diagrams that illustrate an algorithm for modeling a border gateway protocol (BGP-4) network.
Figure 4A:
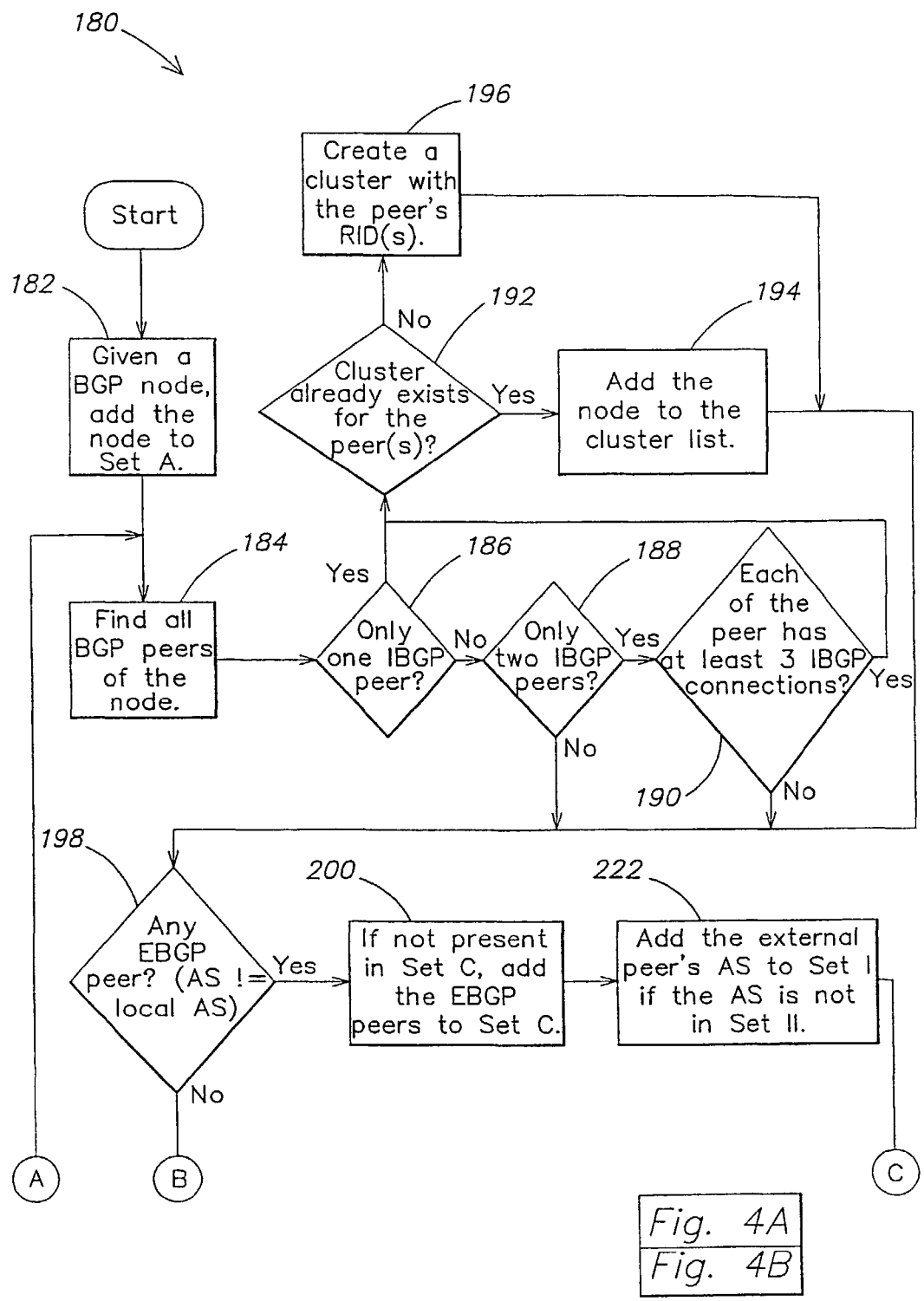
Figure 4B:
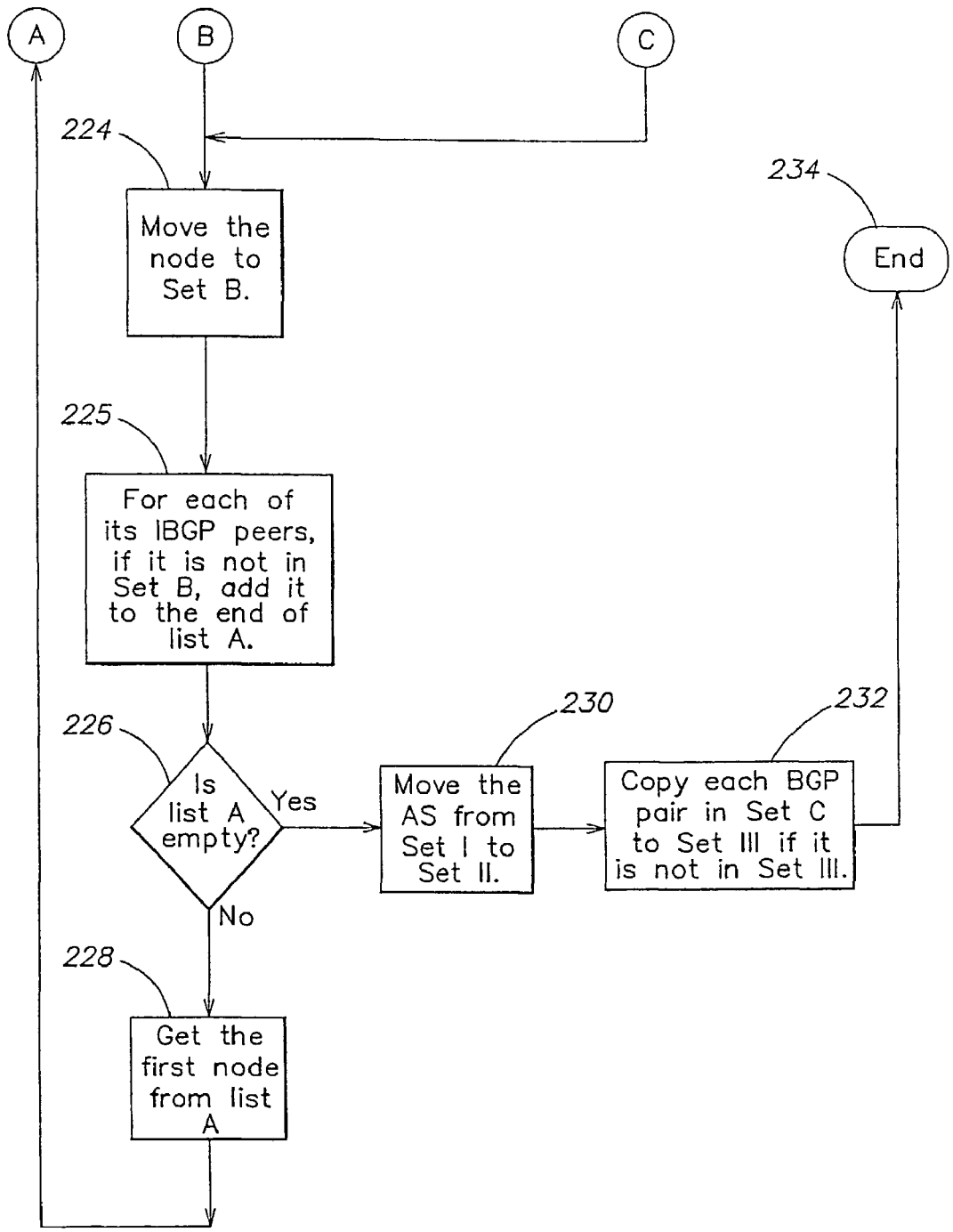

FIGS. 4, 4A and 4B are flow diagrams that illustrate an algorithm for modeling a BGP-4 network as part of a rich, topology model. This algorithm can provide topology and data-path information to fault diagnosis engine 12 (FIG. 1). The algorithm is initiated when a router with BGP peers is nominated for discovery. The fact that the router has BGP peers is determined either by reading a standard (technical standard RFC1657), proprietary MIB, or by parsing an automated telnet session with the router. A BGP router maintains a connection with each peer (as defined by technical standard RFC1771). A connection with a peer in a different AS is known as an external link, or EBGP link (FIG. 2). EBGP links are significant because they indicate which regions (i.e., autonomous systems 40,42 and 48) are adjacent to the region being examined, and which entities in this region are region border entities.

This algorithm can also map a graph of clusters interconnected by route reflectors (RR) and other non-client routers if any such cluster exists in AS 22, 30,34 or 38. The AS may be a sub-AS within BGP confederation 40, 42 or 48. If multiple AS's are returned, the topology represents a BGP confederation. Otherwise, the topology is a single independent AS. The algorithm uses two defined sets for AS as follows: Set I contains a list of AS's we are about to examine; and Set II contains a list of AS's we have visited. Furthermore, the algorithm defines Set III to contain the list of EBGP sessions as the result of the algorithm. For each AS, the algorithm uses three sets as follows: Set A contains a list of nodes we need to examine; Set B contains a list of nodes we have visited; and Set C contains a list of EBGP links we have found in the AS. The algorithm also produces a list of clusters found in the topology.

The algorithm provides Set III with a list of EBGP links in the topology; Set B of each BGPASManager with a list of nodes in the AS; and Set C of each BGPASManager with a list of BGP border nodes in the AS.

Referring to FIG. 4, flow diagram 140 is executed by a BGP Domain Manager, which initializes the set of AS's to examine. The algorithm also initiates the BGP AS Manager with an AS and a BGP node (step 164). Based on the results of the AS Manager, the AS is qualified as either part of a confederation (step 178) or an independent AS (step176). Also, as side effect of calling the AS Manager, in steps 166 through 170, the set of AS's to examine (set I) is updated based on external links discovered. This process will continue examining AS's until the set of AS's yet to examine is empty.

Referring to FIGS. 4A and 4B, a BGPAS manager process 180 runs on a BGP node in a particular AS. The list of peers is retrieved from the device (typically via SNMP). The external links are added to Set C. Adjacent AS's are added to Set I (step 222). The internal peers are added to the set of nodes to examine (set A). If the node has as least three internal peers (step 190), and each peer has at least three peers, the algorithm identifies the node as part of a cluster (step 196).

In step 182 for a BGP node, the algorithm adds the node to Set A and finds all BGP peers of the node (step 184). If there is only one IBGP peer and cluster already exists for the peer, the algorithm adds the node to the cluster list (step 194). If there are only two IBGP peers and each of the peers has at least 3 IBGP connections and cluster already exists for the peer(s), the algorithm adds node to the cluster list. Otherwise, it creates a cluster with the peer's RID(s) (step 196).

In step 200, if not present in Set C, the algorithm adds the EBGP peers to Set C. Step 222 adds the external peer's AS to Set 1 if the AS is not in Set II. Step 224 moves the node to Set B. In step 225,for each of its IBGP peers, if it is not in Set B, the algorithm adds it to the end of list A. If list A is empty, the algorithm moves the AS from Set I to Set II (step 230) then the algorithm copies each BGP pair in Set C to Set III if it is not in Set III (step 232).

Figure 5:
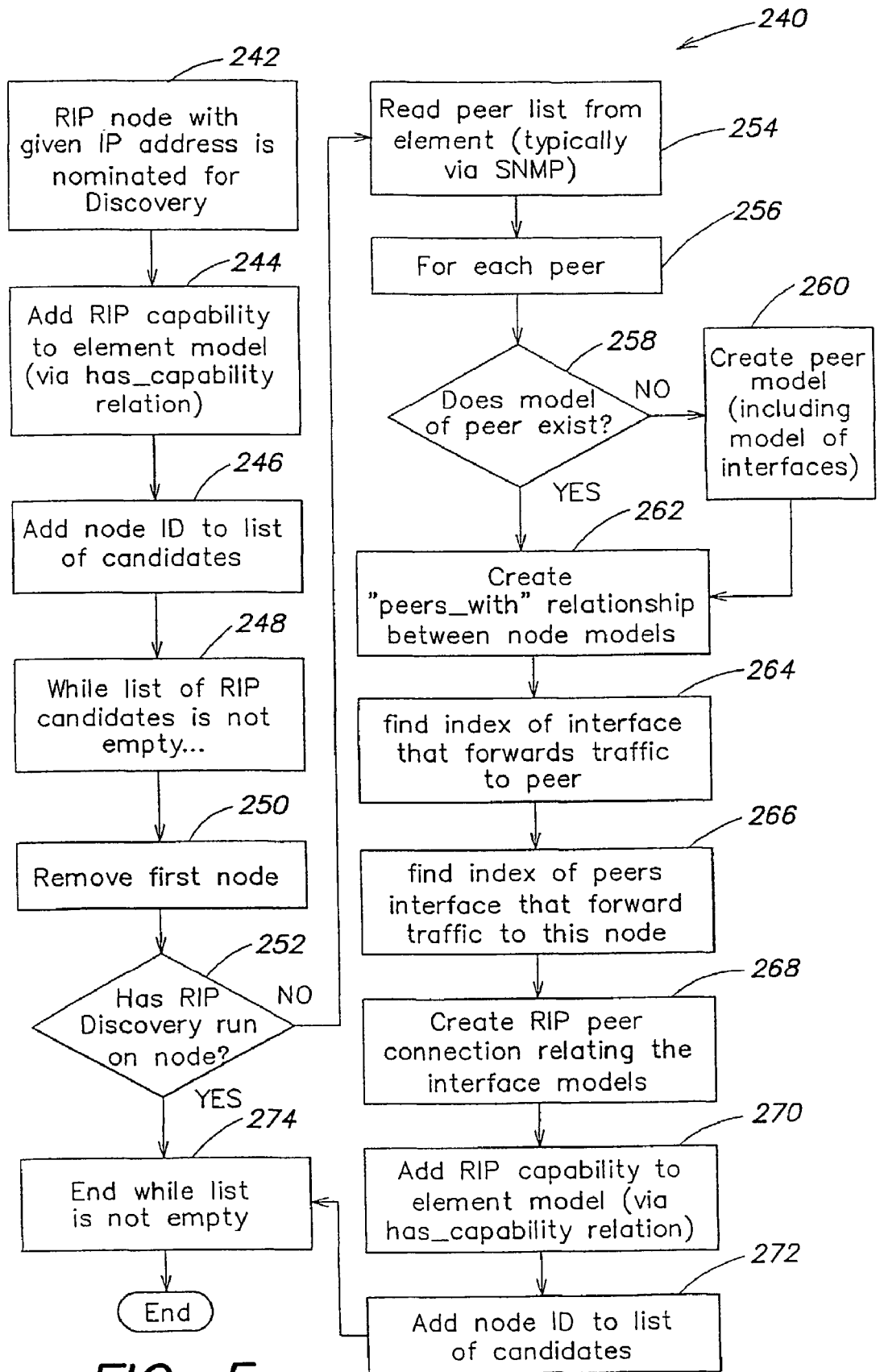
FIGS. 5 and 5A are flow diagrams that illustrate an algorithm for finding Routing Information Protocol (RIP) network.
Figure 5A:
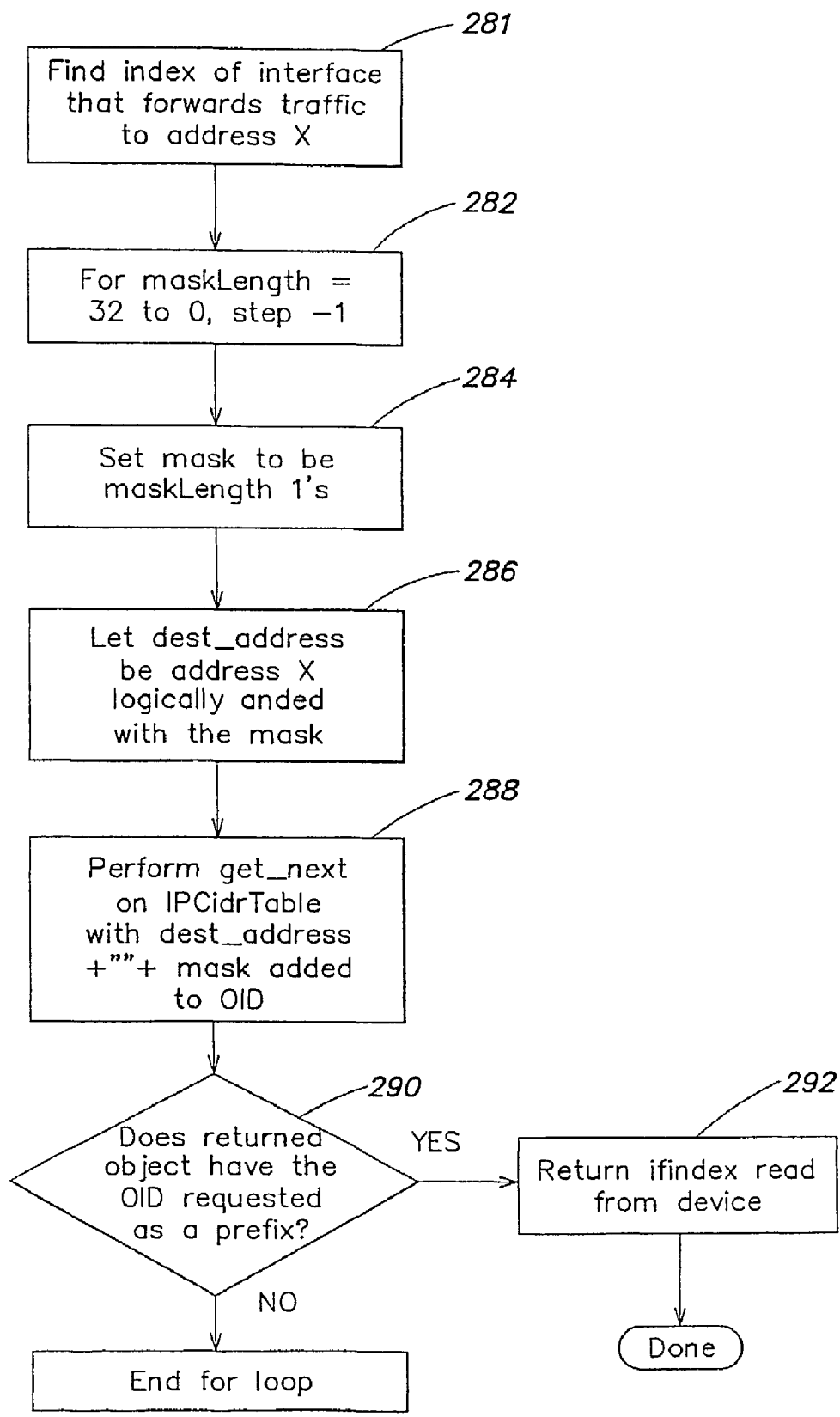

FIGS. 5 and 5A are flow diagrams that illustrate an algorithm for finding a RIP network. This algorithm is initiated when a router running RIP is nominated for discovery. The result of running the algorithm is that the connectivity between all RIP nodes in the region are discovered. In flow chart 240, the algorithm creates "RIP Peer" connections that relate the appropriate interface models of the RIP peer models. Another way of representing the results would be maintaining a list of neighbors and interfaces for each RIP node.

Referring to FIG. 5, the algorithm maintains a list of candidates for RIP modeling. Initially, this list has a single entry—that is the first router found with RIP peers (step 242). Each candidate in the list is processed to determine its peers. Peer determination is done by simply reading an SNMP table (step 254); generally the SNMP table defined by technical standard RFC1724. For each peer, the interface that routes to that peer is determined in steps 256 through 270. The interface of that peer that routes to this node is determined in a similar way. A logical connection, specifically, a "RIP Peer" is created, associating the two interface models (steps 264 and 266). The peer is then added to the list of candidates for discovery, if it hasn't been processed already. Once the list of candidates is empty, the modeling is done.

Steps 281 through 292 are used for finding the interface that is routing to a peer. This is done by figuring out which interface is routing to the peer by "indexing into" the route table, (either the ipCidrTable or ipRouteTable), wherein steps 281-292 are done on the ipCidrTable.

Alternatively, to find the interface that routes to RIP peers, it is also possible to read the ipAddrTable (as defined by technical standard RFC1213). This table contains the ipAddresses and network masks for all the local subnets, and a reference to which interface is attached to each subnet. Because RIP is a broadcast-based protocol all peers will be attached to local subnets. The algorithm of steps 281-292, uses ipCidrTable which is more flexible in that it can find the interface that routes to subnets that are not adjacent to the node being examined. This process, however, could take as many as 32 reads to complete for each peer. Using the ipAddrTable algorithm has an advantage in that, practically, routers generally have less than 32 IP addresses, and the entire ipAddrTable could be read once, and cached for future uses (or finding other peer interfaces).

Figures 6, 6A:
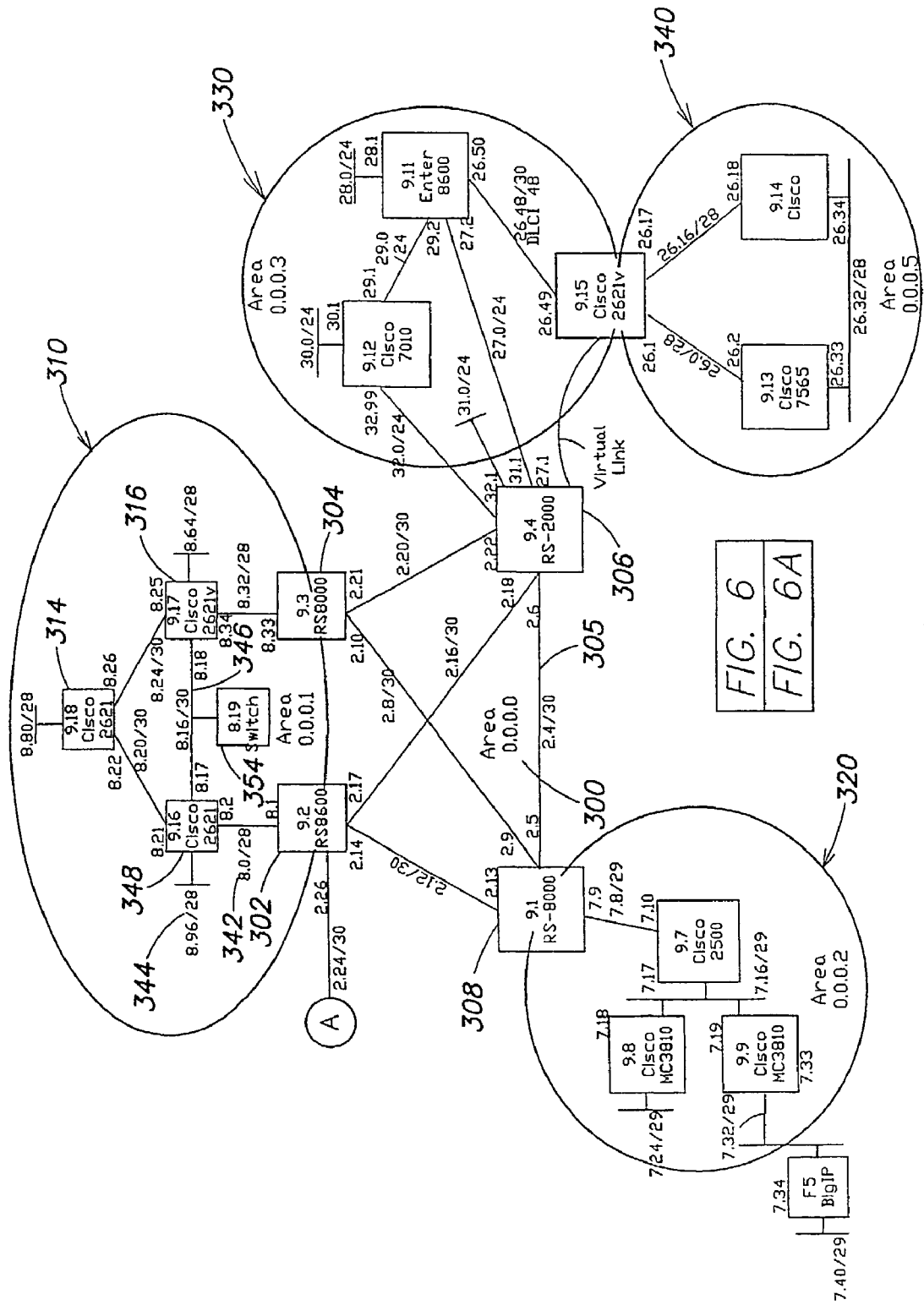
FIGS. 6 and 6A are block diagrams of a routed network configuration of an OSPF network.
Figure 6A:
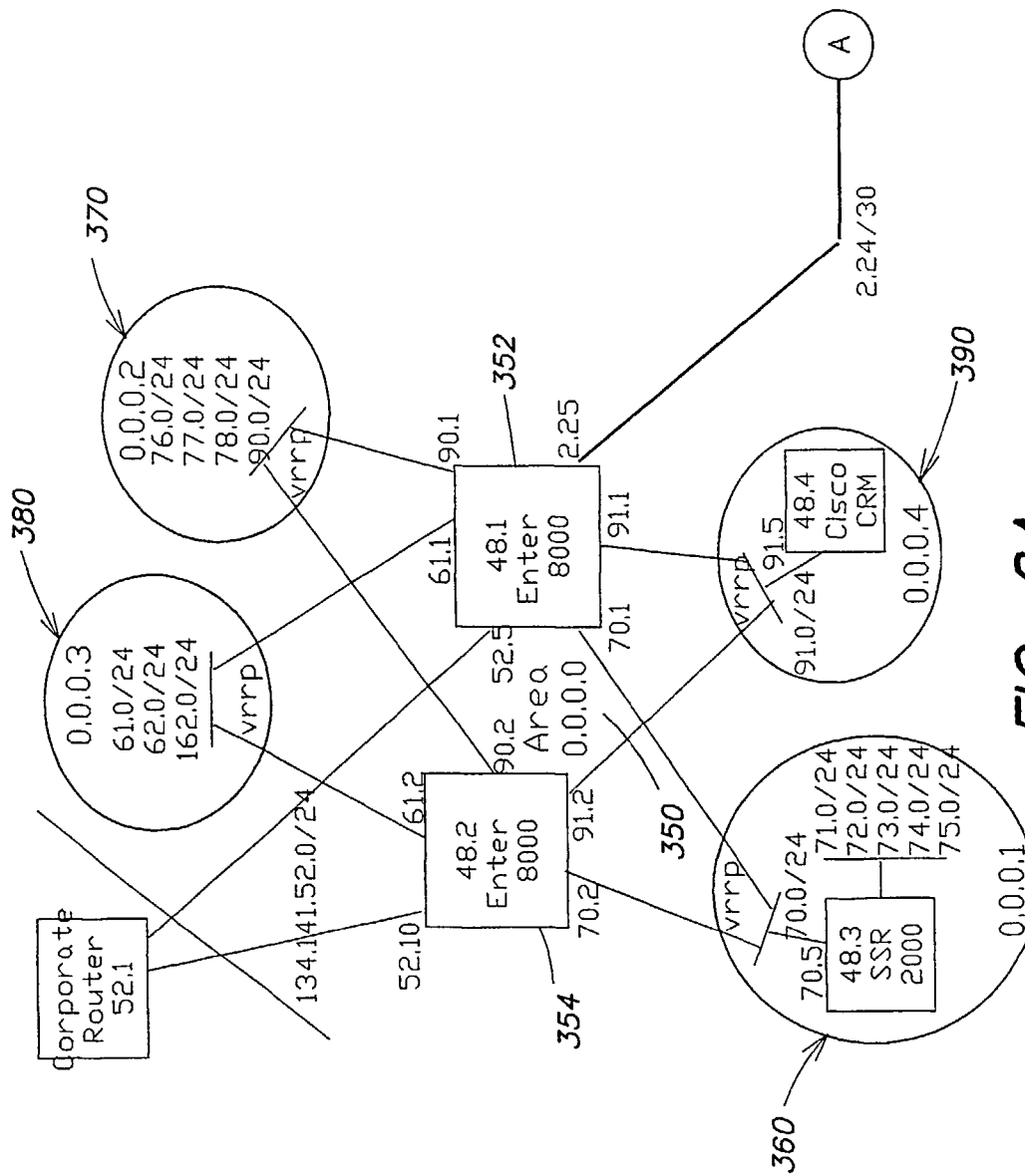

FIGS. 6 and 6A are block diagrams of a routed network configuration of an OSPF network. FIG. 6 illustrates AS 1 with a backbone area 300 (Area 0.0.0.0) and routing Areas 0.0.0.1; 0.0.0.2; 0.0.0.3; and 0.0.0.5. Backbone area 300 (Area 0.0.0.0) includes an external border router 302 (running EGBP) and Area Border Routers (ABR) 304, 306 and 308. Furthermore, FIG. 6 illustrates routers within each sub-domain 310, 320, 330, and 340, such as routers 316,314, & 348 in area 0.0.0.1.

FIG. 6A illustrates another AS 2 connected by EGBP router 352 to EGBP router 302 (FIG. 6). To find the above-mentioned routers, the system executes an OSPF topology search algorithm. The OSPF topology search algorithm finds the OSPF routing backbone 300 and a list of directly and indirectly attached areas in the routing domain. The algorithm identifies ABRs 304, 306 and 308 used in the routing hierarchy. The algorithm can also map a graph of adjacent routers connected by Designated Routers (DR) and Backup Designated Routers (BDR). If only a single OSPF area exists, the backbone area is not necessary. The algorithm considers the following factors:

(1) An area with fewer numbers of internal nodes usually has fewer ABRs. Hence a large area with a large number of ABRs require more concurrent threads to map its topology efficiently.

(2) Avoid reading the link state database of an ABR to retrieve topological information. However, it is feasible to read the same database from an internal node.

(3) Difference between the OSPF backbone area and a non-backbone area. Specifically, a backbone area consists of relatively more ABRs than a regular area, and it may not have any internal nodes. This calls for different area mapping strategies for the backbone and non-backbone areas.

(4) Minimizing SNMP related management traffic.

In the diagram of FIG. 6, area 0.0.0.2 is a stub area which uses default routes to route packets bound for inter-area and OSPF external destinations. Area 0.0.0.1 is a regular area where routers 348, 314 and 316 can accept OSPF advertisements regarding both inter-area and external destinations. Thus, routers 348, 314 and 316 can optimize routes to these destinations. Autonomous System Border Routers (ASBRs) allow routing information to be exchanged between the OSPF domain and other routing domains. Area Border Routers (ABRs) 304, 306 and 308 connect non-backbone areas to the OSPF backbone. Routers internal to an area are Internal Routers (IRs) such as router Cisco 2500 (FIG. 6). Internal Routers do not keep topology information about other areas. OSPF allows virtual links to be set up between two ABRs.

Figure 6B:
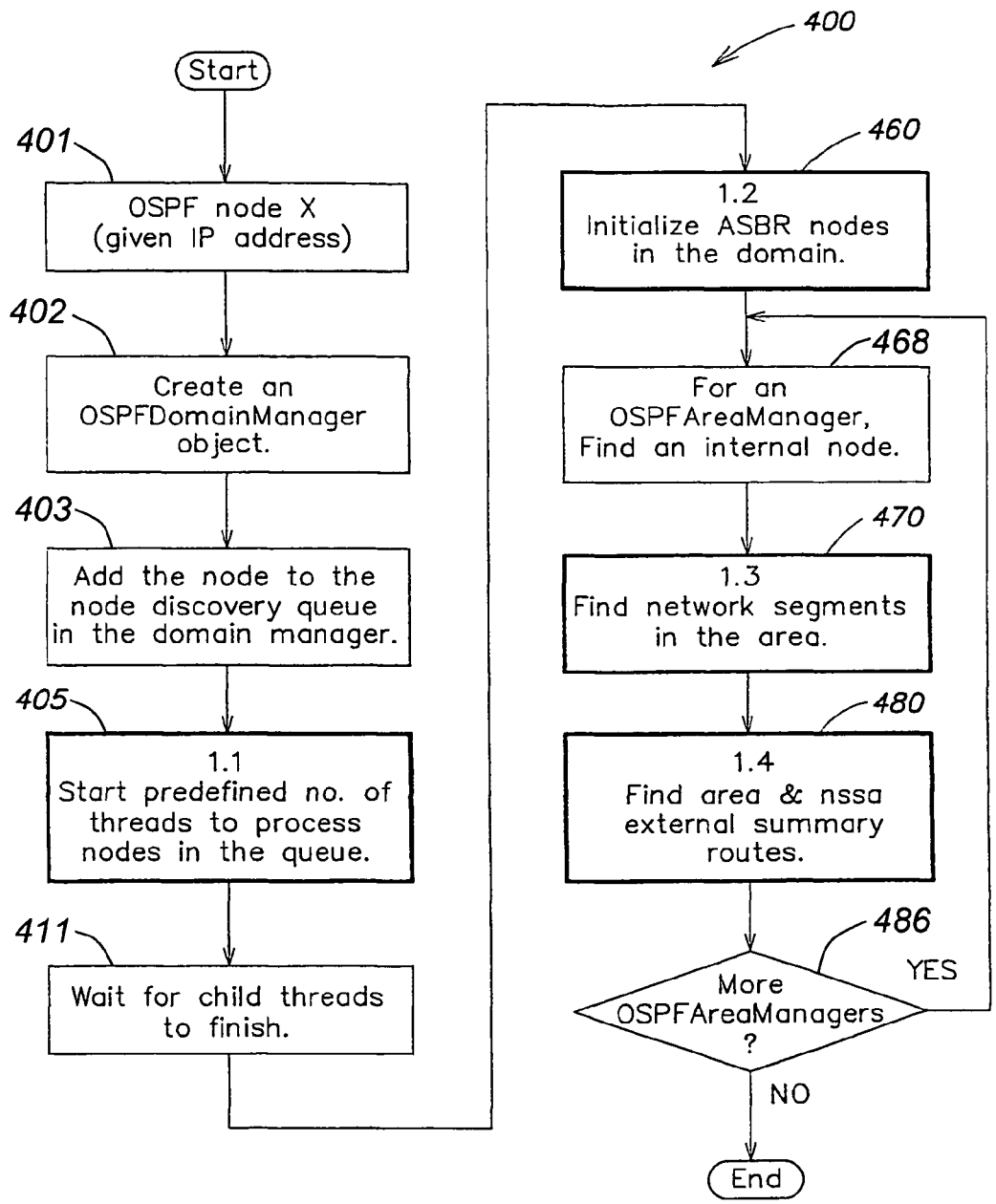

The OSPF Domain Manager is responsible for discovering OSPF Networks. As shown in FIG. 6B, a single OSPF Domain object is created for each OSPF domain that needs to be discovered (step 402). Each OSPF Domain needs a single OSPF Node to seed the discovery process(step 401). The domain manager has a queue that contains OSPF Nodes that need to be processed (step 403)and has a number of threads to perform OSPF Node discovery with (step 405 and FIG. 6C). Each thread will pull one node off the queue (step 406) and discover and process that node. During node processing, additional nodes will be placed on the queue(step 408). Once all the nodes have been discovered & processed (step 410), the queue will be empty. At this point, all the active devices have been discovered. The AS borders within this set must now be identified (step 460). Next the passive network segments need to be discovered and modeled(step 468). This is done by creating an Area Manager for each discovered Area, selecting a representative node, and reading tables to find network segments (step 470), summary routes, and external routes that area advertised (step 480).

Figure 6C:
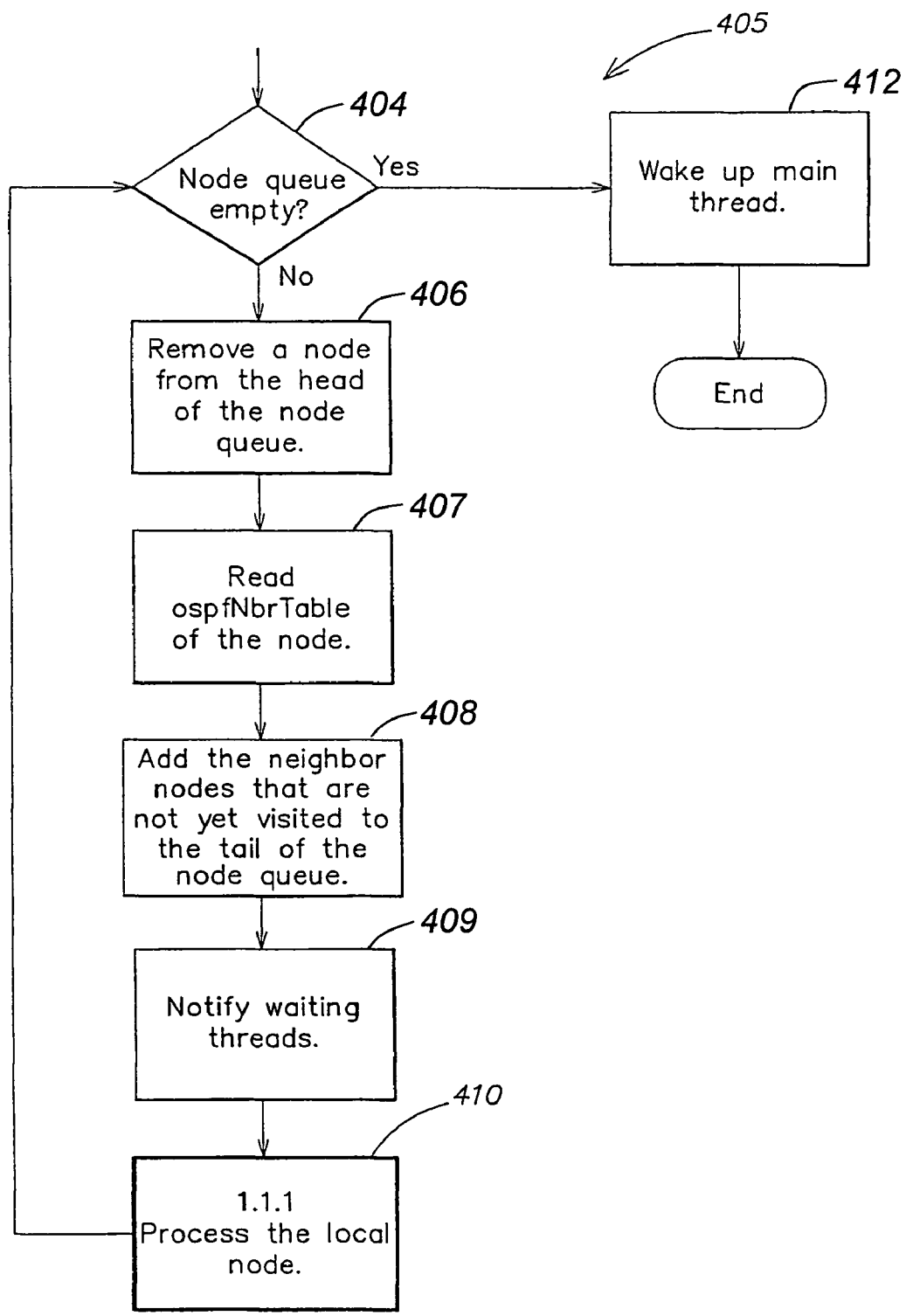

FIG. 6C shows per thread processing to determine OSPFNodes (i.e., OSPFNode discovery). In algorithm 405, each thread will take a single node off the queue (step 404 and 406), read the neighbor table (step 407), process this information, and add any new neighbors to the queue to be discovered (step 408). The thread will then process other tables explained below (step 409 and 410). Once the last node has finished processing, control returns to the main algorithm thread (step 412).

Referring to FIG. 6D, in algorithm 410 OSPF Node processing is responsible for creating the model of the node(step 414-418) and populating the node's attributes (step 421-425). During processing, models for OSPF Areas that the node is a member of will also be created. (step 420). Virtual Links that the node may participate in are also discovered if the node is an ABR (step 429 and 430). Interfaces and adjacencies will be processed and modeled as well (step 440, and 450).

Figure 6E:
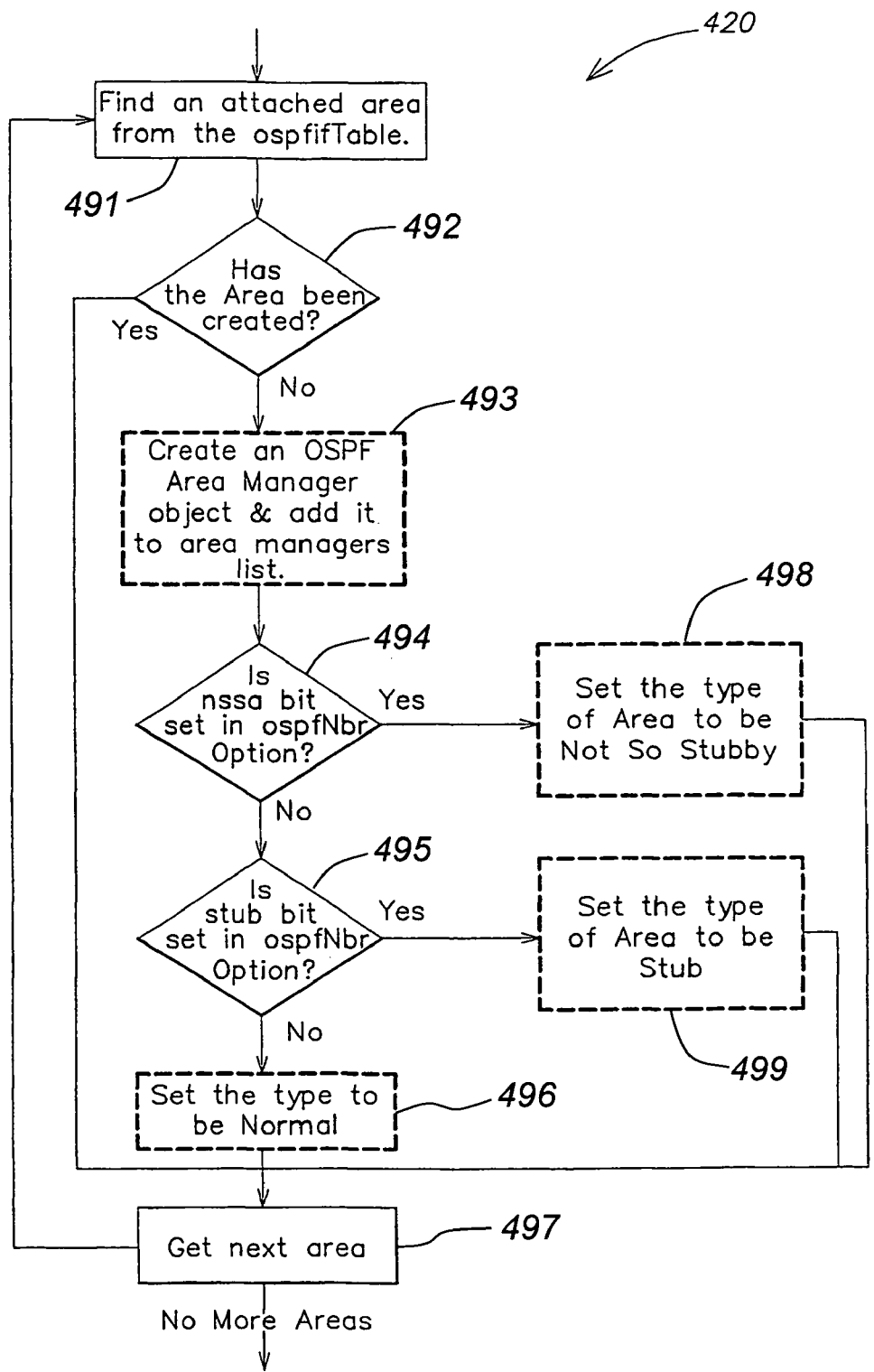

Referring to FIG. 6E, in algorithm 420, each interface is examined for its area membership. The area ID is used to find any existing Area Managers for that area(step 491). If none are found (step 492), then a new Area Manager is created (step 493). The type of area is then determined by checking the flags in the tables. The flags indicate whether NSSA is selected (step 494), Stub is selected(step 495), or if both are off that the area is a normal area (step 496). All nodes that are members of the Area will have identical settings for the Area, so this is done only when the area is first encountered.

Figure 6F:
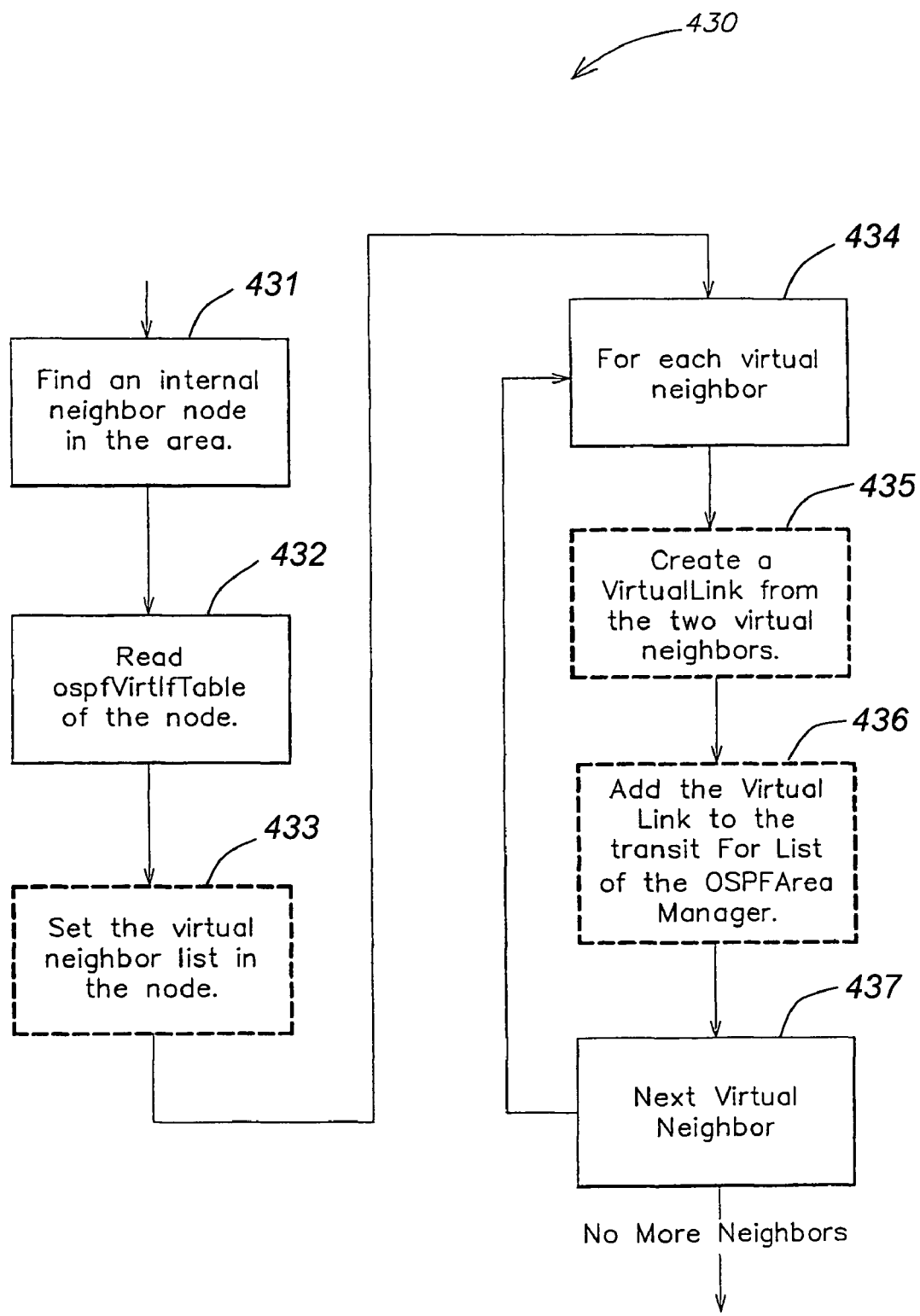
Figure 6G:
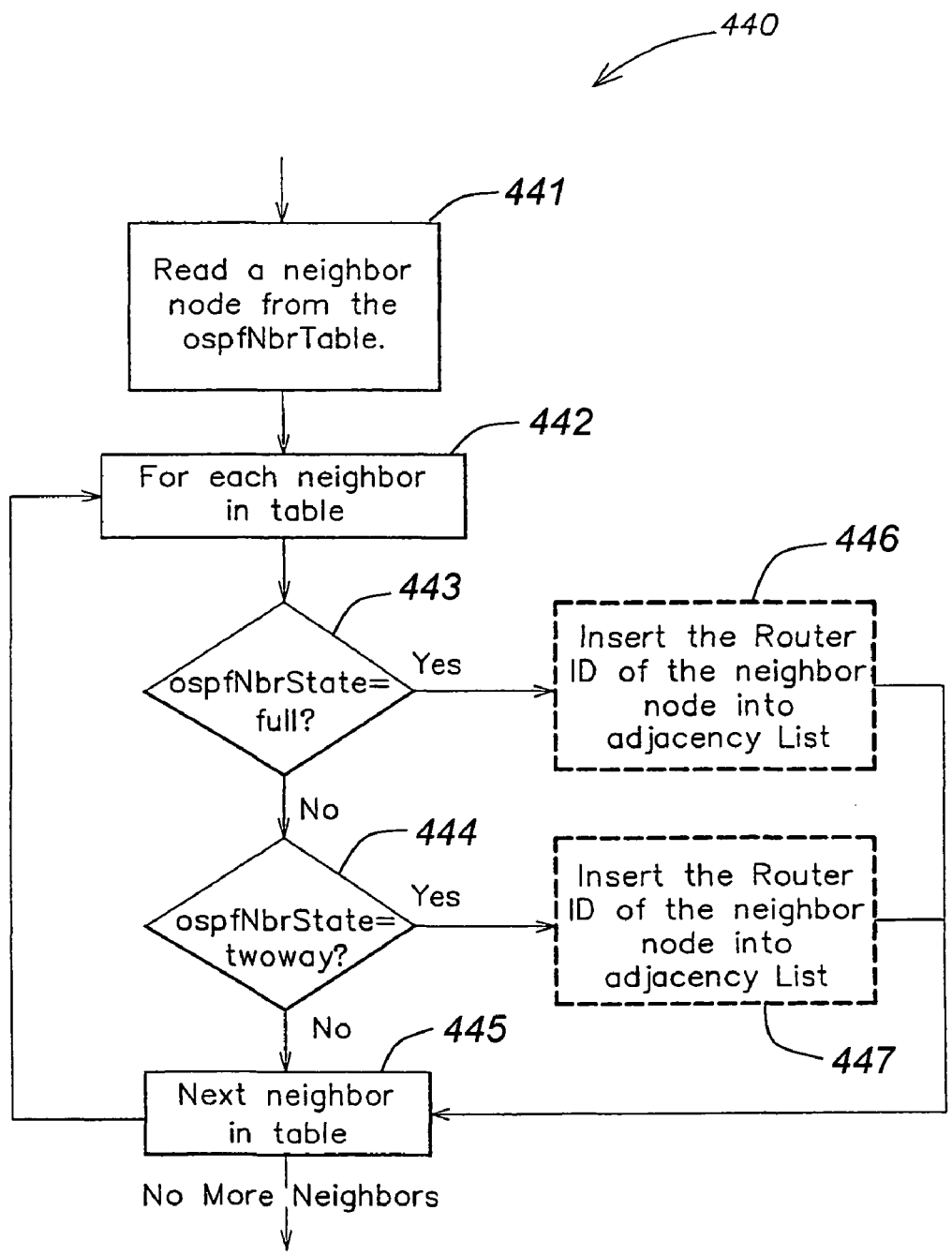

Referring to FIG. 6F, virtual link algorithm 430 determines, for any ABR, if there are any Virtual Links configured. This is done by reading the virtIfTable (step 432). For each virtual neighbor that is encountered, we create an object that will represent the connection (step 435 and 436). Referring to FIG. 6G, algorithm 440 initializes OSPF node adjacency list. While reading the neighbor table (step 441), only those neighbors that have progressed to "full" (step 443) or "two-way" (step 444) are included in the adjacency list (step 446 and 447).

Figure 6H:
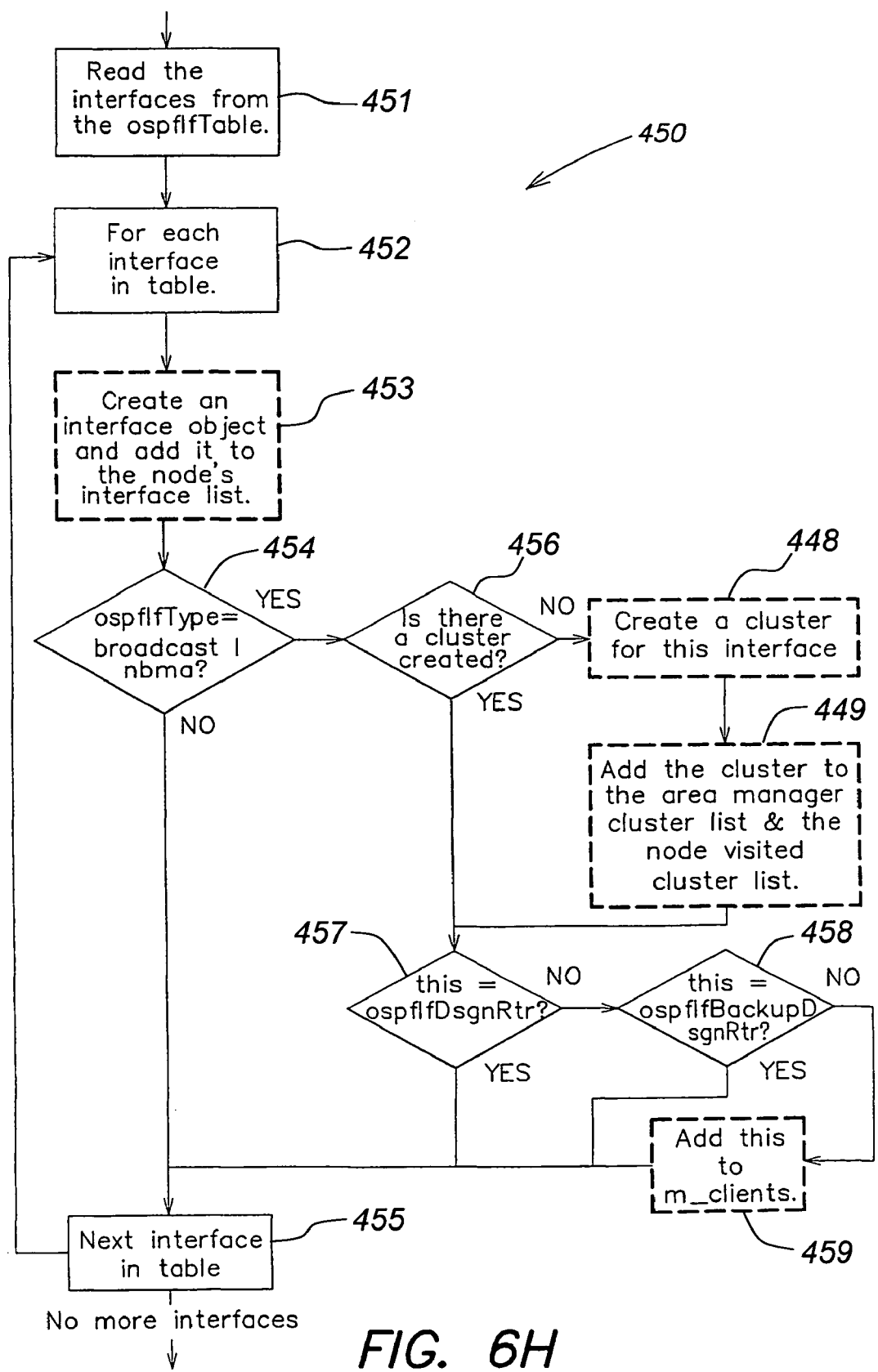
Figure 61:
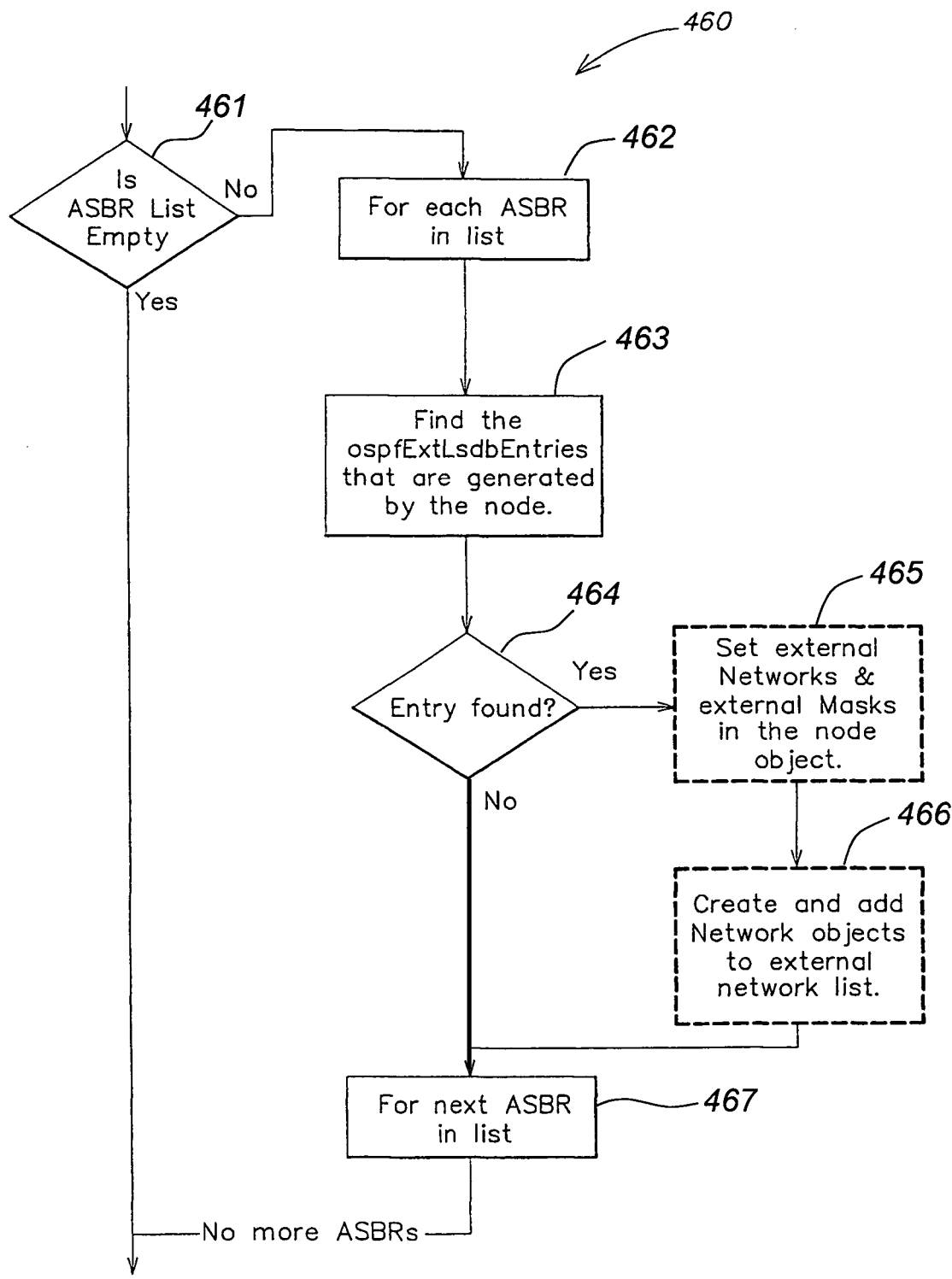

Referring to FIG. 6H, algorithm 450 initializes interfaces and clusters. For each interface in the ospfIfTable (step 451 and 452), a model is created (step 453). This model is populated with information from the table (step 454). If the type is either broadcast or multiple access, then a cluster should be created (step 456, 448 and 449) to model the relationship between all the other interfaces heard off the network and tag the designated and backup routers (step 457 and 458).

Referring to FIG. 6I, algorithm 460 initializes the ASBRNodes. For each ASBR (step 462), the external networks and routes it advertises need to be discovered and modeled (step 463). Reading the extLsdb table does this (step 464). Then the OSPFDomain Manager creates objects to represent the networks (step 465-466).

Figure 6J:
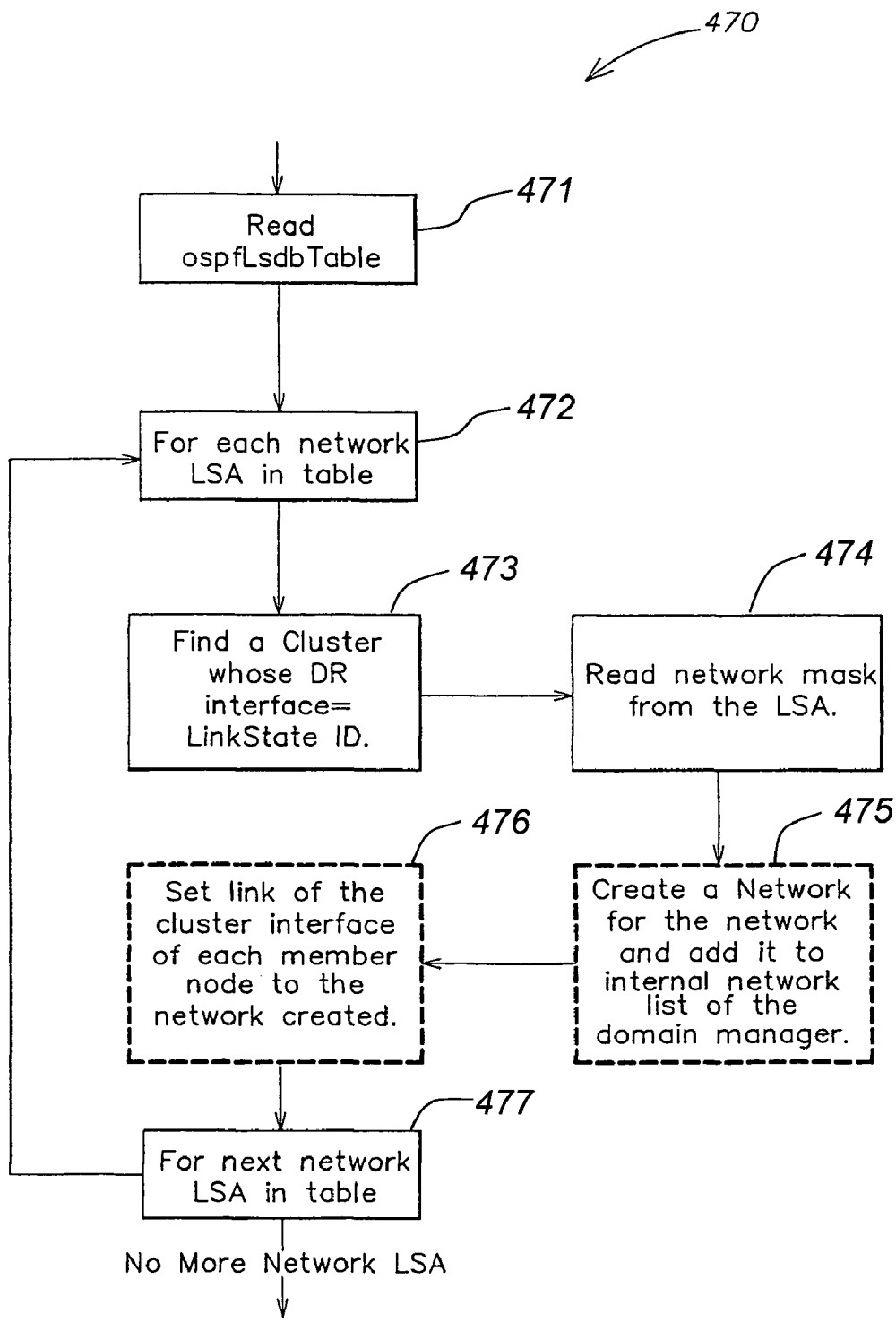
Figure 6K:
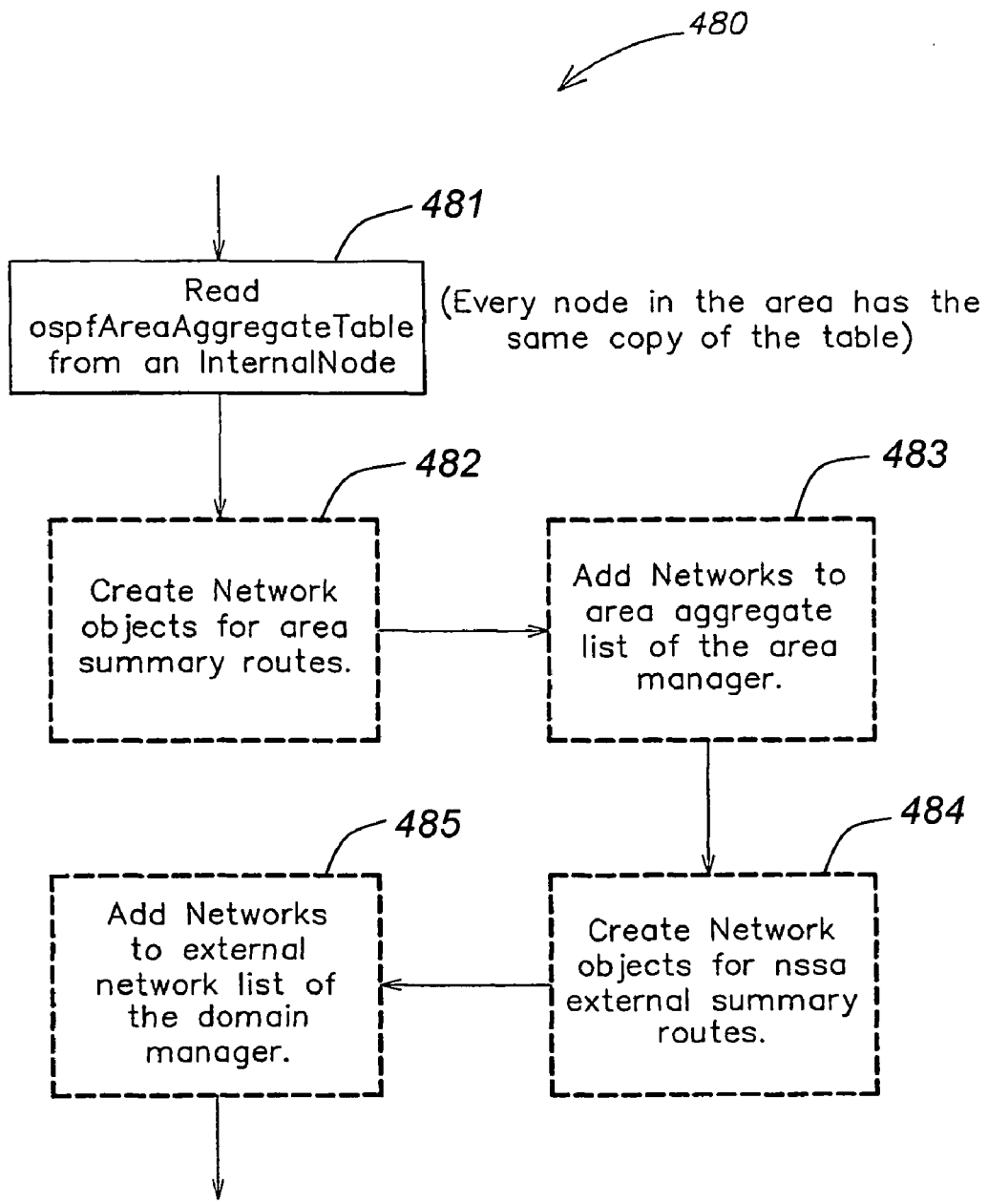

Algorithm 470, shown in FIG. 6J, finds network segments within an area. For each network Link-State Advertisement in the LSDB (step 472), create a network model (step 472-477). (Instead of reading the LSDB from a representative router from the area, another approach is to read all the interface tables from all routers in an area.) After finding network segments in an area, referring to FIG. 6K, algorithm 480 finds external summary routes. For the representative node, the process reads the area aggregate table (step 481). This table contains the external summary routes that are propagated to the network. A network model must be created for each one (step 482-485).

Figure 7:
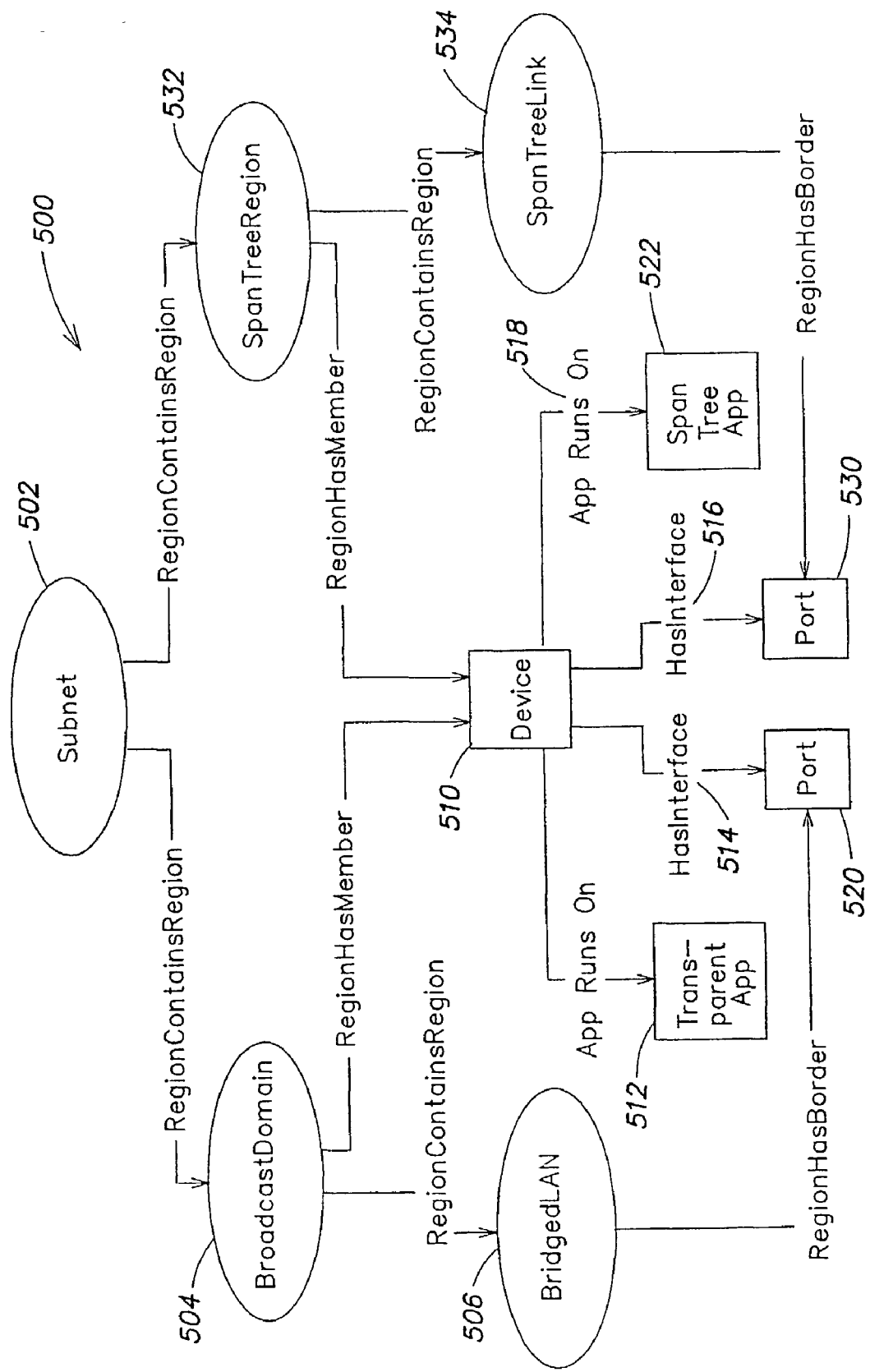
FIG. 7 illustrates diagrammatically a semantic Layer-2 topology model.

FIG. 7 illustrates diagrammatically a semantic Layer-2 topology model. This model is the "blueprint" or "template" containing the rules for creating a Layer-2 topology model. This model is created and maintained by the Layer 2 discovery algorithm to be described in the following paragraphs.

Referring again to FIG. 2A, IP subnet 70 was discovered during a layer 3 analysis. The following Layer-2 data model description and discovery algorithm determines Layer-2 topology information contained within given Subnet 70. Futhermore, an algorithm described in U.S. Pat. No. 5,727, 157 may be used to discover the connection to Internal Routers. The Layer-2 discovery algorithm employs object-oriented design methodologies to perform the required work.

The SpanTreeApp model 522 represents the ability of device 510 to run and participate in the Spanning Tree Protocol. The ability is modeled by creating an AppRunsOn relationship between the device 510 and the SpanTreeApp 522. When the app model is created during the "discover network protocols" process (described in FIG. 3A), the object will read the spanning tree MIB tables of the device by sending the READ_SPANNING_TREE_TABLE message to itself. The message is used so it can be overridden by proprietary, vendor-specific apps. The object will then store the data.

The object will then attempt to create a new SpanTreeRegion model 532 and add the device model 510 as a member via the RegionHasMember relationship. It will do this by first finding all of the Subnets of which the device is a member, then creating a new SpanTreeRegion model 532 inside each Subnet if none already exists. If one already exists, it will use that one. If the device is not yet a member of a Subnet (because some layer 3 discovery has not yet run), then it will watch the HasMember relation, and will continue when it becomes a member of a Subnet. When the device has been added as a member of a SpanTreeRegion 532, the object will then send the CORRELATE_REGION message to the SpanTreeRegion 532 to tell it to re-discover the topology (SpanTreeLinks) in that region.

This object is also registered for the DISCOVER_TABLES message. When the message is received, the object will re-read the STP tables (using the READ_SPANNING_TREE_TABLE message) and store the new data.

This object also registers for the GET_SPANNING_TREE_DATA message. When the message is received, the object returns the spanning tree MIB data stored.

If none is stored yet, it will send the READ_SPAN-NING_TREE_TABLE message to get it from the device.

This object registers for the READ_SPAN-NING_TREE_TABLE message and reads the dot1dStp table when triggered. Other proprietary objects derived from this object override this message and get spanning tree information from another vendor-specific source.

The SpanTreeRegion model 532 is responsible for discovery and modeling of the spanning tree topology in a single Subnet. This object listens for the CORRELATE_REGION message. This object knows that during initial creation of models, there are likely to be many CORRELATE_REGION messages sent to it in a short amount of time. To handle this, it does not start correlation as soon as it receives the message. It starts a timer (30 seconds), and only starts correlation once the timer expires. Each time a new message is sent, it restarts the timer. When the timer expires, it performs the correlation by sending the GET_SPANNING_TREE_DATA message to each region member to get spanning tree data, getting all port and MAC address info in the region, and then running its correlation algorithm. The correlation algorithm is a well-known algorithm in the industry.

Modeling the spanning tree topology entails determining which ports in this region have a forwarding or blocking connection, creating a SpanTreeLink model 534, and relating the SpanTreeLink to each port 530 via the HasBorder relation. Each link is then related to the SpanTreeRegion via the RegionContainsRegion relation. The root bridge is also determined during correlation and stored in an attribute of the SpanTreeRegion model 532.

When re-discovery occurs, the object will simply find all existing SpanTreeLink models, save them in a list, remove all HasBorder associations, and then perform the correlation again. It will reuse as many of the existing SpanTreeLink models as it can. If it runs out, it will create more. If there are some left over, it will destroy them.

This object is responsible for detecting changes in the spanning tree topology, and triggering rediscovery. It does this by registering a timer to trigger it periodically. It reads the stpTopChanges MIB object of the root bridge to detect if a topology change has occurred.

If a topology change has occurred, the object gets all of the members of the SpanTreeRegion, and sends each of them the DISCOVER_TABLES message to re-read their spanning tree tables. Then, the object sends the CORRELATE_REGION message to itself to rediscover the spanning tree topology.

The SpanTreeLink model 534 represents a logical, spanning tree connection between two ports 530 on two different devices which support the Spanning Tree Protocol. This object contains an attribute which stores whether the connection is in the "forwarding" or "blocking" state.

The TransparentApp model 512 represents the device's ability to run and participate in the Transparent Bridging Protocol. The ability is modeled in the system by relating the device model 510 to the TransparentApp model 512 via the AppRunsOn relationship. When the app model is created by the "network protocol discovery" process (described in FIG. 3A), the object will read the transparent bridging forwarding database MIB tables of the device by sending the READ_T-PFDB_TABLE message to itself. The message is used so it can be overridden by proprietary, vendor-specific apps. The object will then store the data.

The object will then attempt to create a new BroadcastDomain model 504 and add the TransparentApp model 512 as a member. It will do this by first finding all of the Subnets of which the device is a member, then creating a new Broadcast-Domain model inside each Subnet if none already exists. If one already exists, it will use that one. If the device is not yet a member of a Subnet (because some layer 3 discovery has not yet run), then it will watch the HasMember relation, and will continue when it becomes a member of a Subnet.

When the device has been added as a member of a BroadcastDomain 504, the object will then send the CORRELATE_REGION message to the BroadcastDomain to tell it to re-discover the BridgedLANs in that region. This object is also registered for the DISCOVER_TABLES message. When the message is received, the object will re-read the TpFdb tables (using the READ_TPFDB_TABLE message) and store the new data.

This object also registers for the GET_TPFDB_DATA message. When the message is received, the object returns the TpFdb MIB data stored. If none is stored yet, it will send the READ_TPFDB_TABLE message to get it from the device.

This object registers for the READ_TPFDB_TABLE message and reads the dot1dTpFdb table when triggered. Other proprietary objects derived from this object override this message and get transparent bridging information from another vendor-specific source.

The BroadcastDomain model 504 is responsible for discovery and modeling of the transparent bridging (physical) topology in a single Subnet 502. This object listens for the CORRELATE_REGION message. This object knows that during initial creation of models, there are likely to be many CORRELATE_REGION messages sent to it in a short amount of time. To handle this, it does not start correlation as soon as it receives the message. It starts a timer (30 seconds), and only starts correlation once the timer expires. Each time a new message is sent, it restarts the timer. When the timer expires, it performs the correlation by sending the GET_TPFDB_DATA message to each region member to get TpFdb data, getting all port and MAC address info in the region, and then running its correlation algorithm.

The correlation algorithm is a well-known algorithm in the industry and defined in an IETF RFC, as well as explained in numerous patents. Modeling the transparent bridging topology entails determining which ports 520 in this region are physically connected, creating a BridgedLAN model 506, and relating the BridgedLAN to each port via the HasBorder relation. Each link is then related to the BroadcastDomain 504 via the RegionContainsRegion relation.

When re-discovery occurs, the object will simply find all existing BridgedLAN models, save them in a list, remove all HasBorder associations, and then perform the correlation again. It will reuse as many of the existing BridgedLAN models as it can. If it runs out, it will create more. If there are some left over, it will destroy them.

The BridgedLAN model 506 represents a physical connection between two ports 520 on two different devices, at least one of which must support the Transparent Bridging Protocol.

Furthermore, the determination of physical topology in computer networks between repeaters and bridges is described in U.S. Pat. No. 5,297,138. Another apparatus and method for determining a computer network topology is described in U.S. Pat. No. 5,727,157, which is incorporated by reference.

Figure 8:
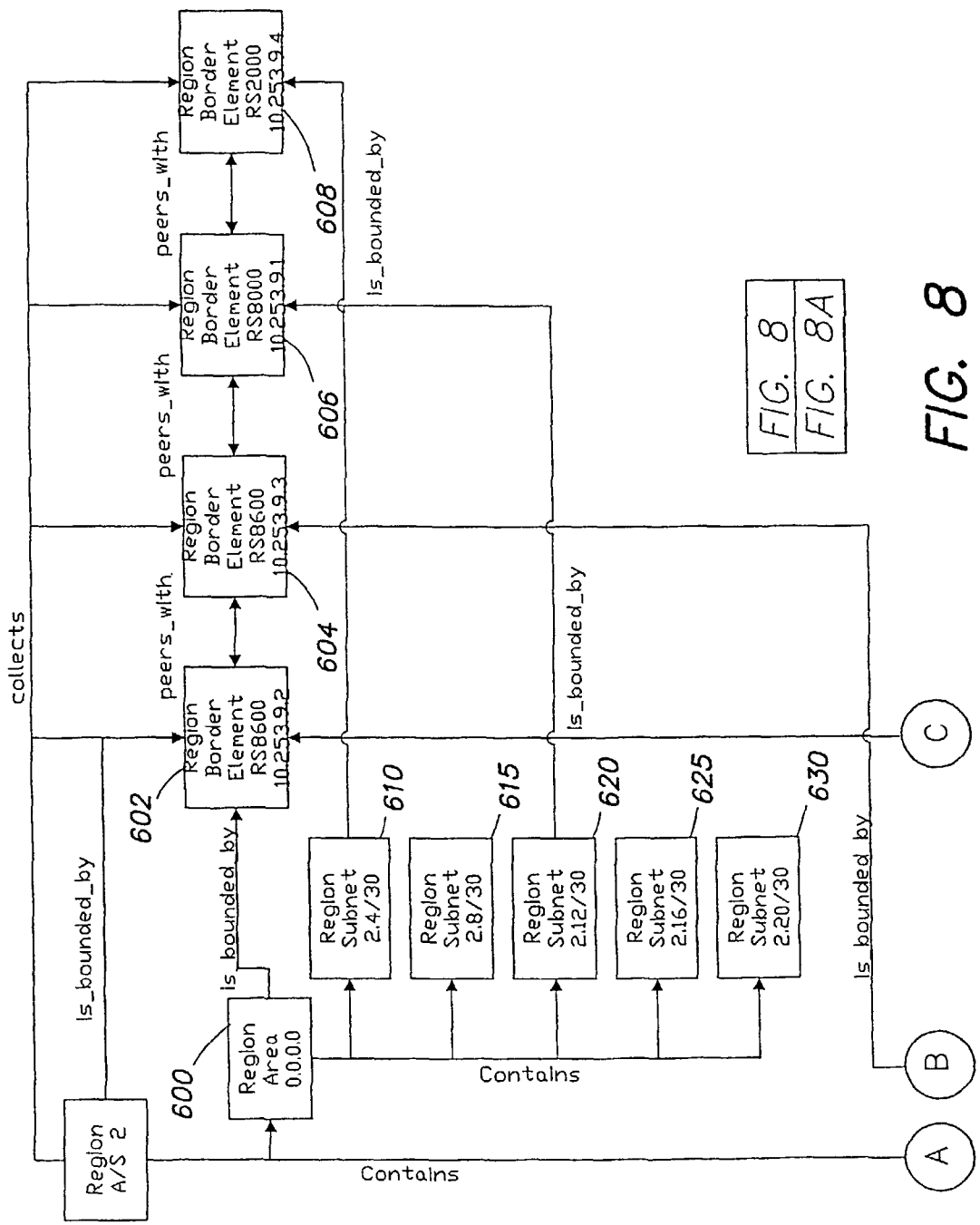
FIGS. 8 and 8A show diagrammatically a rich multilayer topological model of a portion of the communications network of FIG. 1.
Figure 8A:
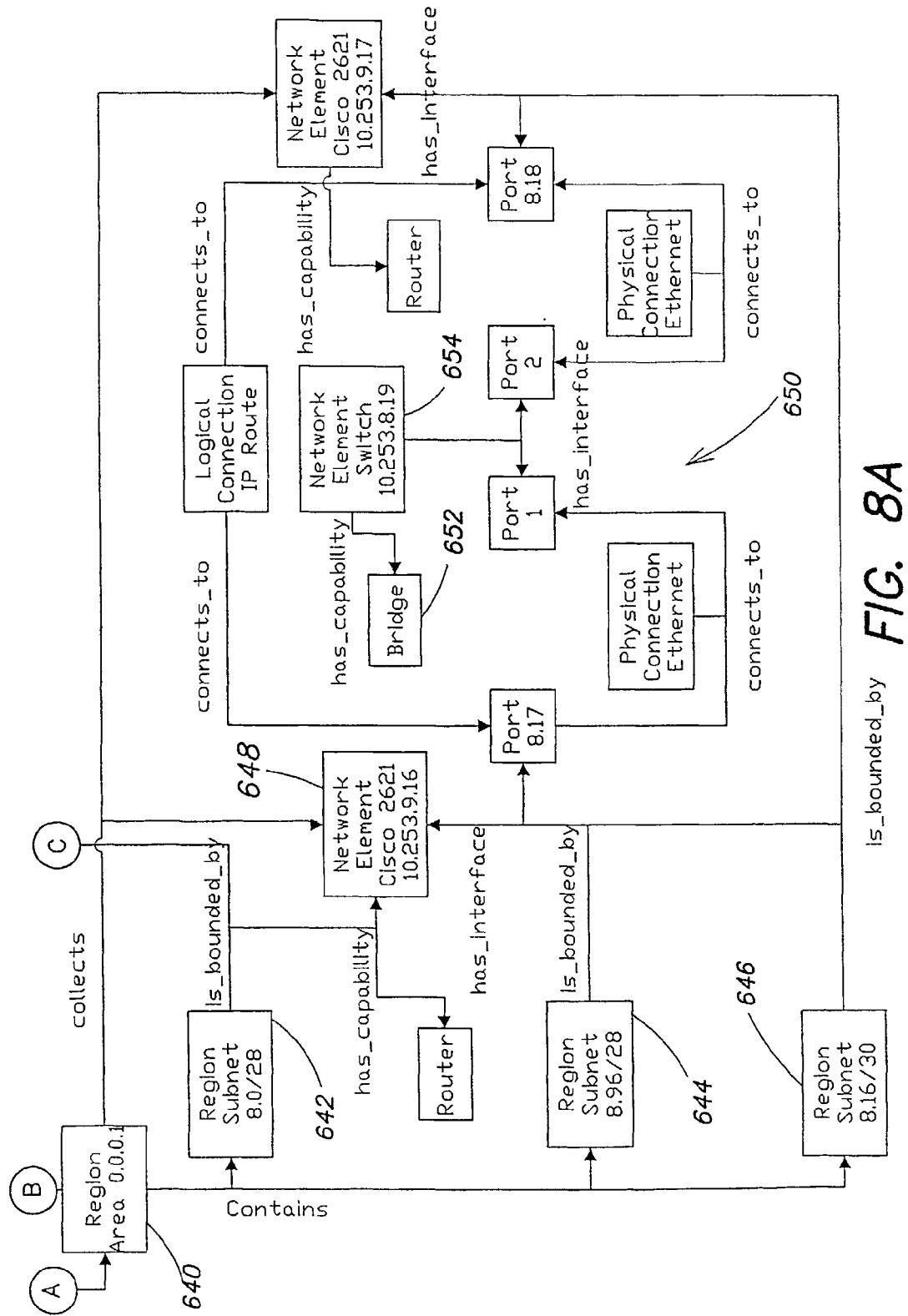

FIGS. 8 and 8A shows diagrammatically a rich multilayer topological model of a routed network located within the communications network of FIG. 1 as stored inside the topology mapper 14. This multi-layer topological model can be understood also in connection with FIG. 6 (and FIGS. 2 and 2A). The block diagram of FIG. 8 displays an autonomous system A/S 2 including an Area 0.0.0.0 (block 600) and containing a subnet 2.4/30 (shown in FIG. 6 as 305 and block 610 in FIG. 8), a subnet 2.8/30 (block 615), a subnet 2.12/30

(block 620), a subnet 2.16/30 (block 625), and a subnet 2.20/30 (block 630), all of which are shown in FIG. 6 in Area 0.0.0.0. In FIG. 6, Area 0.0.0.0 is bounded by routers 302, 304, 306, and 308, and this relationship is shown in FIG. 8 by block 602, 604, 606, and 608, representing the corresponding peer routers. These routers are found by running the above-described algorithm.

Furthermore, the block diagrams of FIGS. 8 and 8A display autonomous system (i.e., Region A/S 2) the connection of Area 0.0.0.0 (block 600) to Area 0.0.0.1 (block 640 in FIG. 8A) connected by routers 302 and 352 shown in FIGS. 6 and 6A, respectively;

The rich, multi-layer topological model can include three modeled topologies: Current, Historical, and Intended Topology. The system can use different ways to represent multiple versions of the examined network topology. The NMS an create a whole new model of the topology after detecting a change in the topology. This embodiment, while time-consuming and memory intensive, makes servicing requests of historical topologies fast and easy.

Alternately, the NMS can show relationships between network element models, and relationships between element models themselves. This is versioned via a start date and end date indicating the period of time during which the relationship existed (or during which an element was in the state represented). The versioning of the port model is useful mainly for a critical metric change, such as bandwidth for a port.

Preferably, the system performs servicing of the historical topology queries. This allows time and memory space savings when maintaining the historical model (but a difficulty is that the model has to find the relationships that were active during the specified time).

Figure 8B:
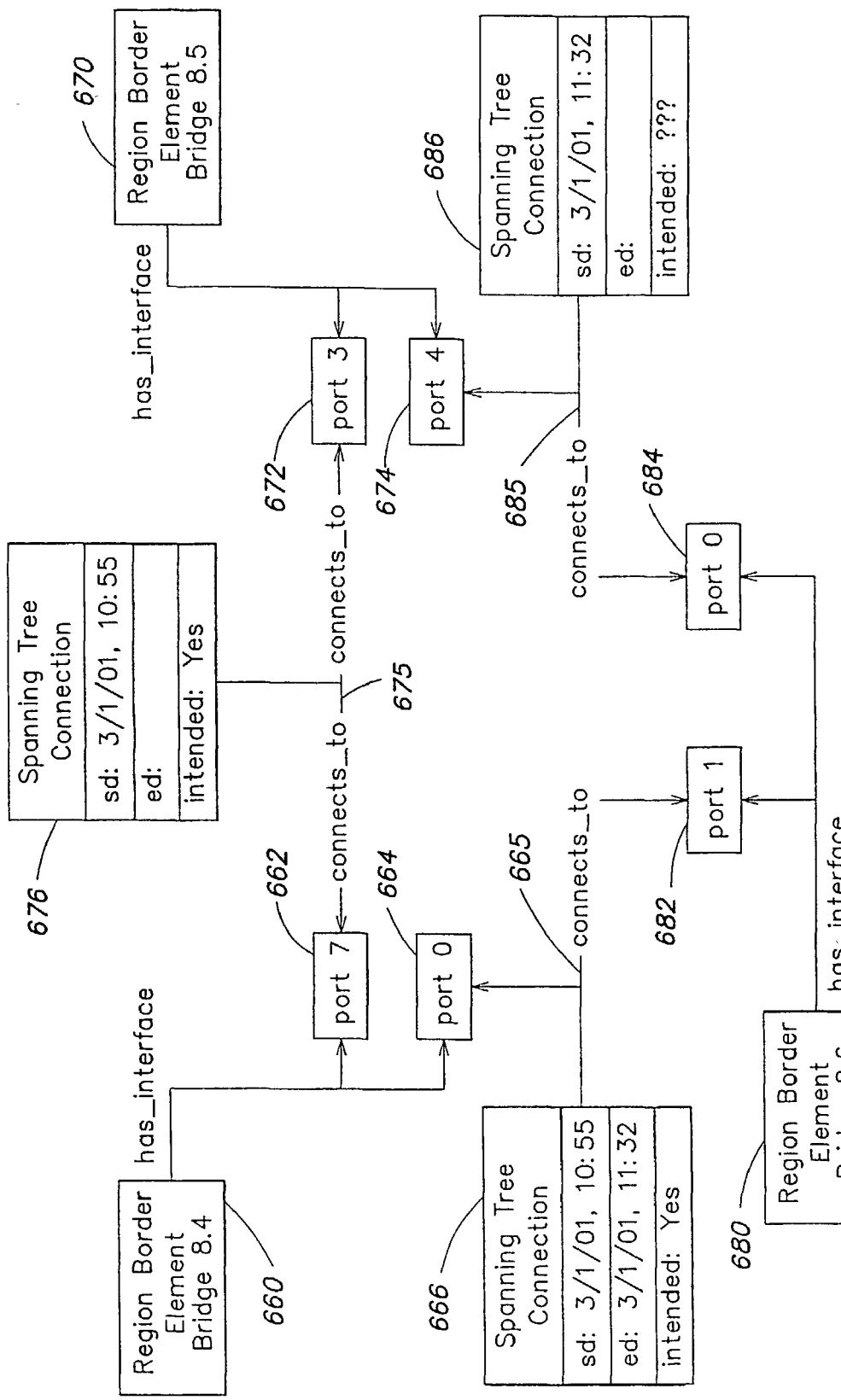
FIG. 8B shows diagrammatically an intended and historical relationship between three modeled elements.

In general, to distinguish between intended topology and current topology, the system can construct multiple versions, or preferably show network model and relationships between network element models and add an "intended" flag to the relationships between topology models. The system assumes, for the most part, that the modeling process finds intended network element, so there is usually no flag on the network element models. FIG. 8B shows diagrammatically an intended and current relationship.

FIG. 8B depicts a bridge 660 with ports 0 and 7 (blocks 662 and 664), a bridge 670 with ports 3 and 4 (blocks 672 and 674), and a bridge 680 with ports 0 and 7 (blocks 682 and 684). Status tables 666, 676, and 686 show the status of the respective connections 665, 675, and 685.

FIG. 8B illustrates the spanning tree relationship between bridges 660, 670, and 680. For example, the connection between port 674 and port 684 was not present, or was blocked, when this subnet was originally modeled at around 10:55 (see status tables 666 and 676). The other Spanning Tree connections 665 and 675 did exist at that time, and the intended flag is set to "Yes" in status tables 666 and 676 indicating that this was the desired state of the network.

Later, however, the Spanning Tree connection 665 has gone down, and a new Spanning Tree connection 685 has come up. As shown in status table 686, connection 685 was modeled at 11:32 (status table 666), and the operator has not indicated whether this connection is now intentional or not, so the intended flag is set to "???" ("unknown"). This scheme allows the model to keep a history of changes in the network, and to document which changes were intentional.

This algorithm can be extended to give network elements an "intended" status. In some environments, the above-described algorithms may discover network elements that are not supposed to be on the network. An operator would be allowed to validate each network entity model, as well as each connection model, thereby specifying which elements are not part of the intended design.

Figure 9:
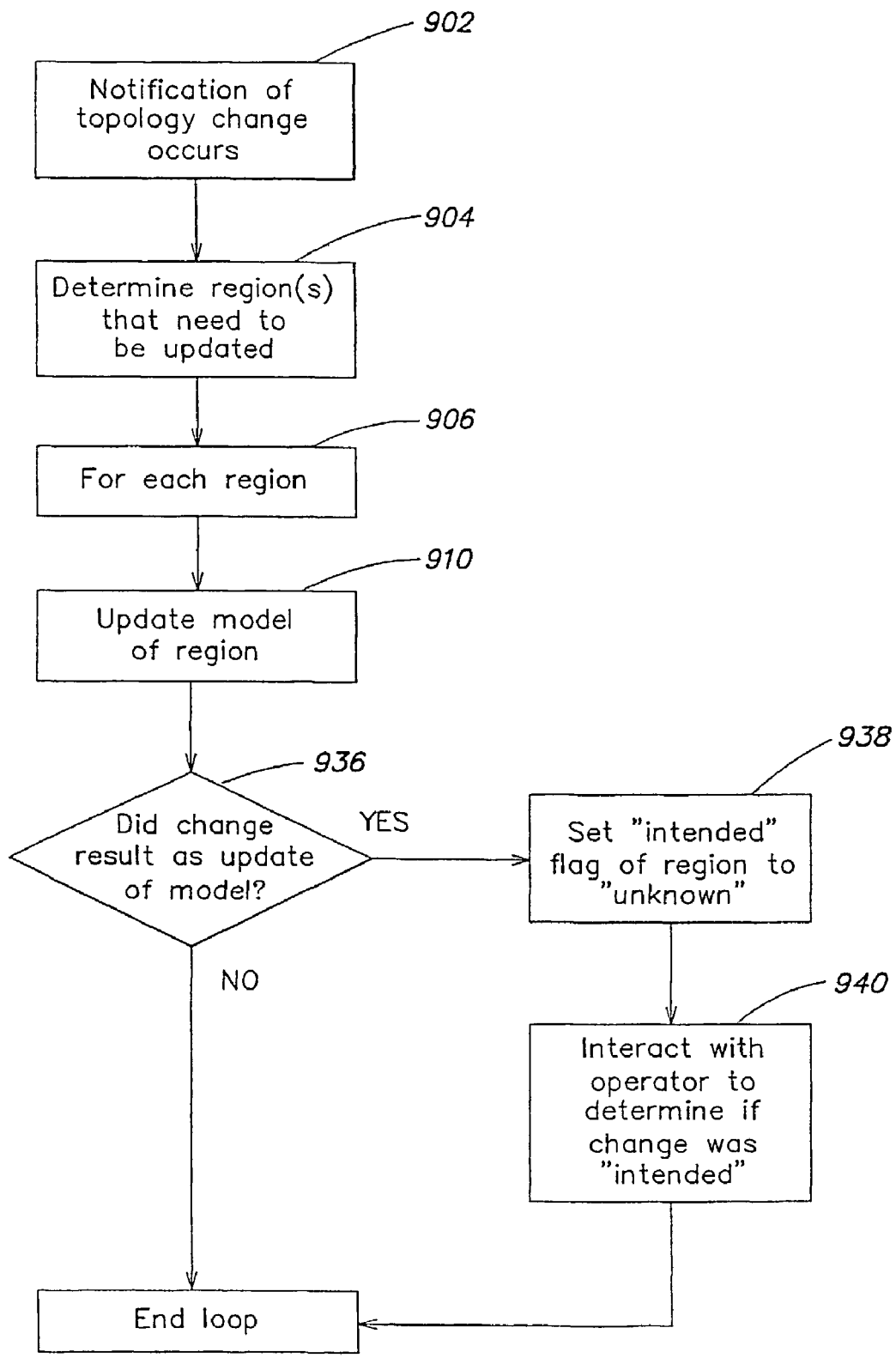
FIGS. 9, 9A, and 9B are flow diagrams that illustrate an algorithm for finding a change in network topology, for example, after displaying the network in a model shown in FIGS. 8, 8A, and 8B.
Figure 9A:
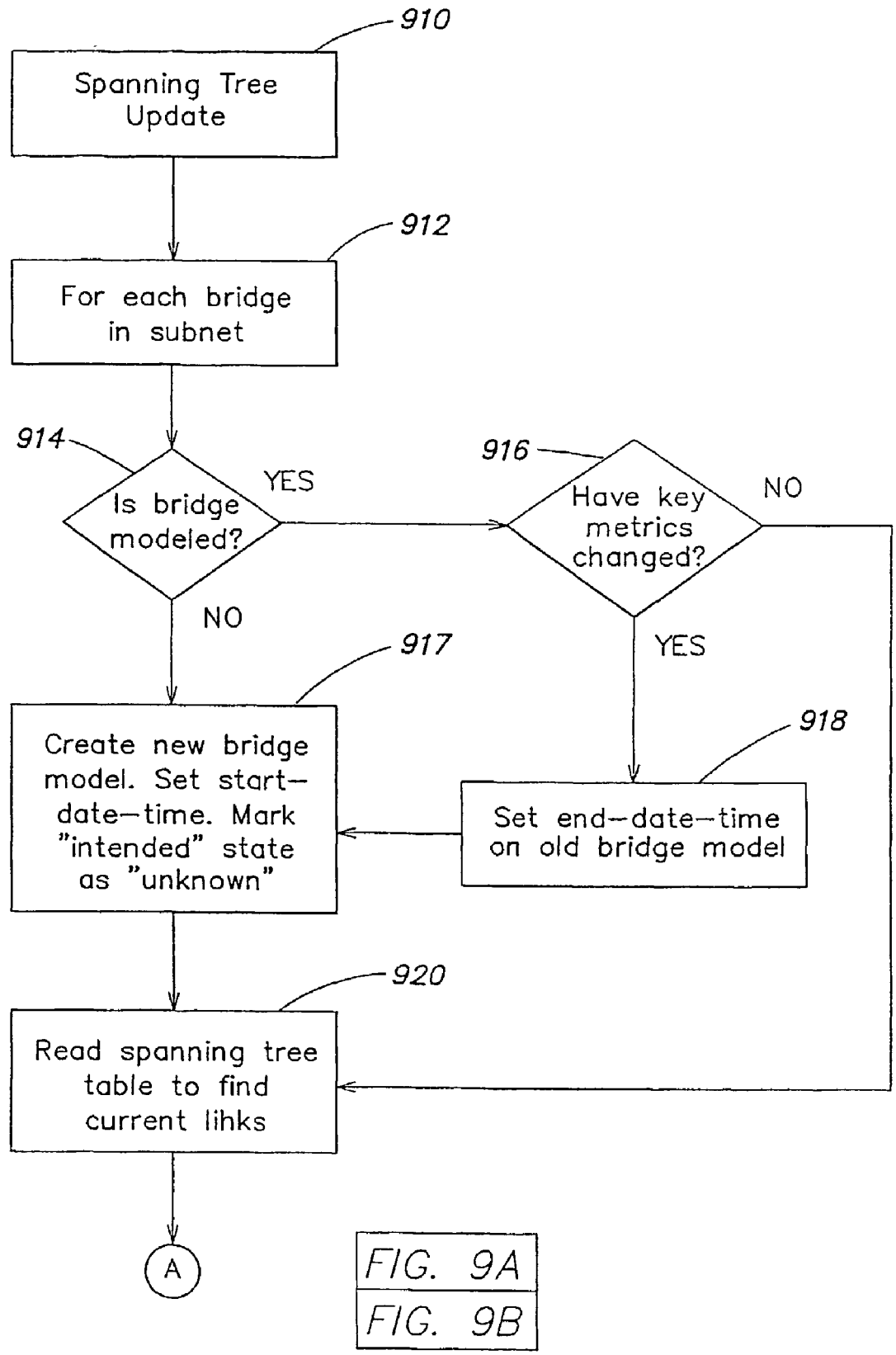
Figure 9B:
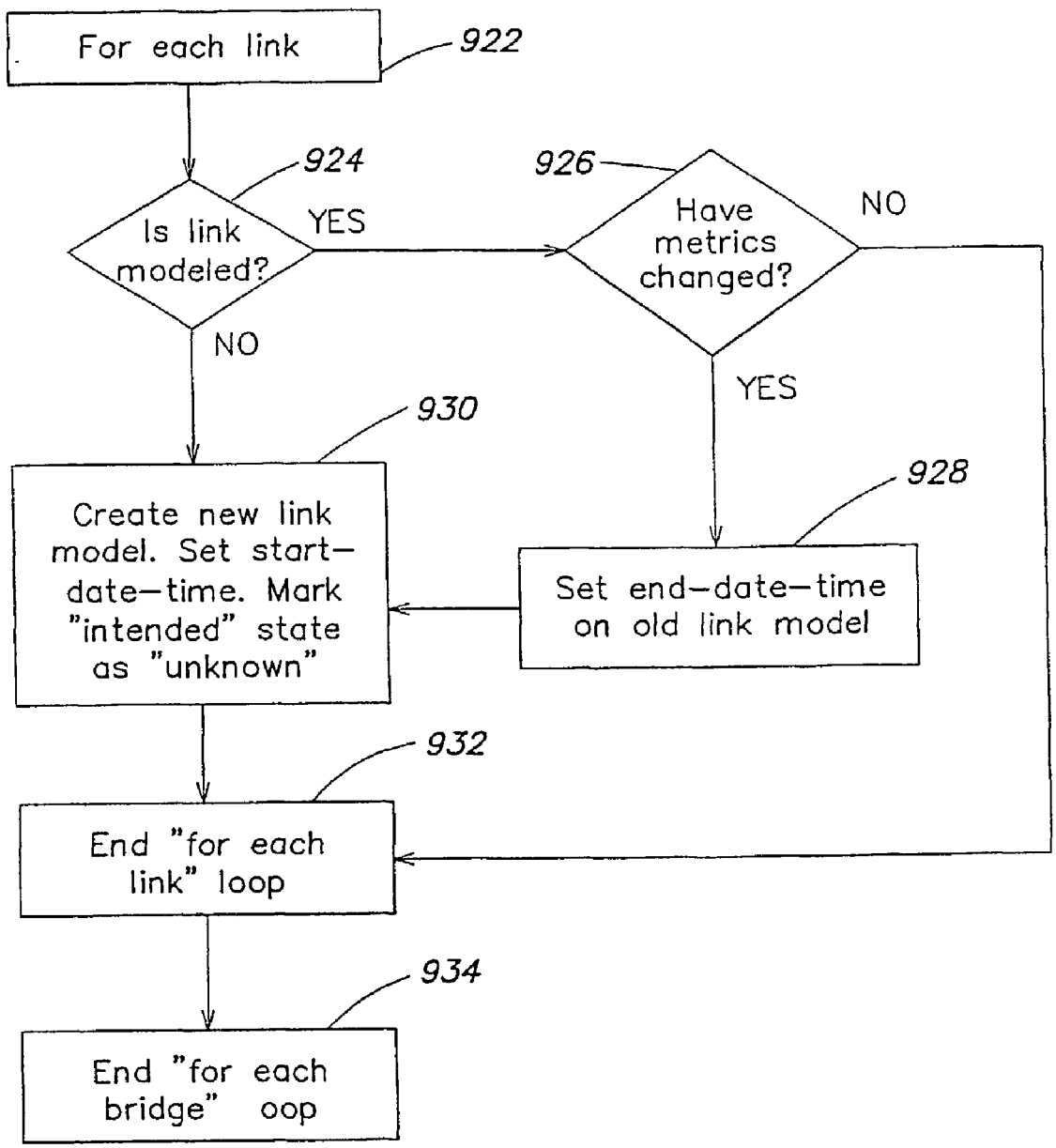

FIGS. 9, 9A, and 9B are flow diagrams that illustrate an algorithm for finding a change in network topology, for example, the network topology shown in FIGS. 8, 8A, and 8B.

Figure 9C:
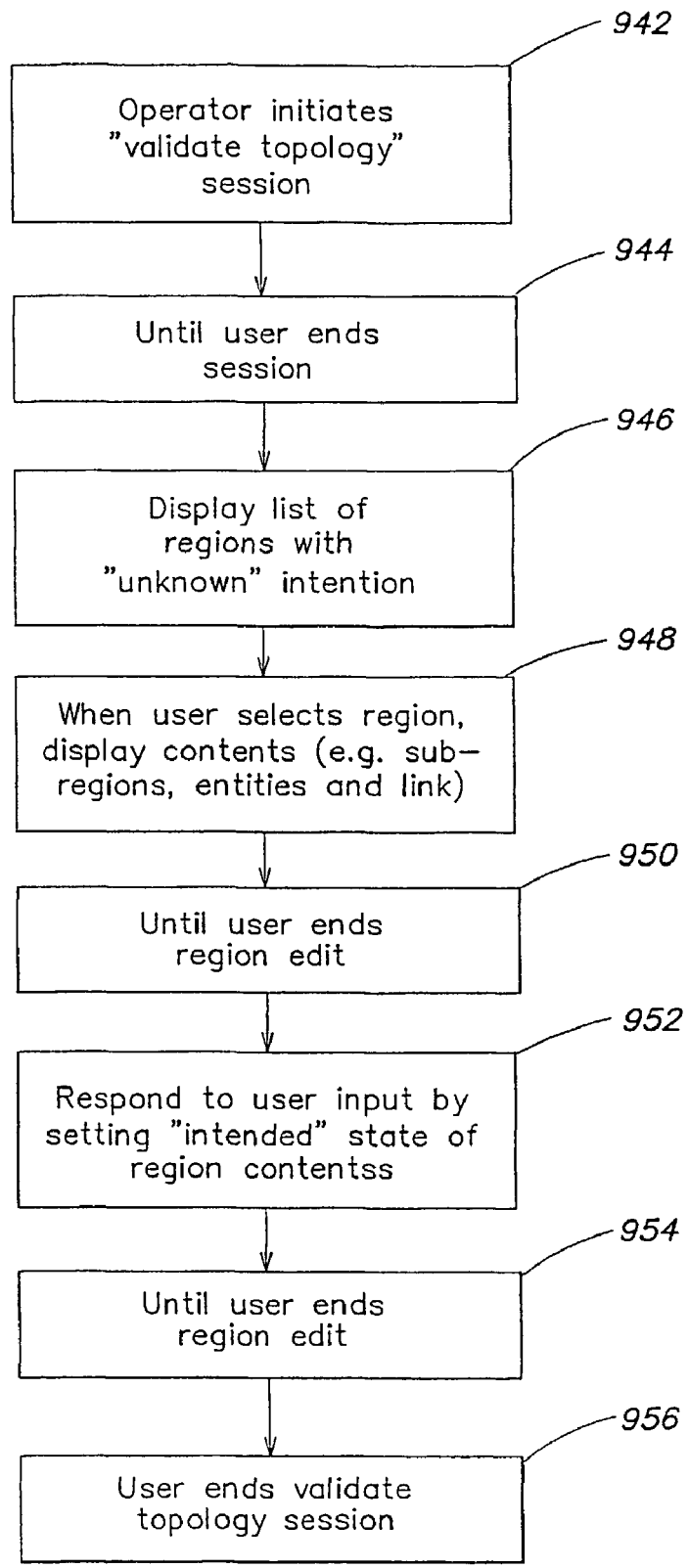
FIG. 9C is a flow diagram that illustrates an algorithm for validating network topology.

FIG. 9C is a flow diagram that illustrates an algorithm for validating the intended network topology after finding changes.

To be useful, a topological model must respond to change and reflect that topological change in the internal model. There are several aspects of handling topology change that impact performance of the network and of the topology model itself. Those aspects are monitoring of the network and the required update of the data representation.

The topological model watches a representative element of the hierarchical network. Generally, a device maintains an internal topology of some sort of devices that are running the same protocol that it is running. The device keeps an internal topology because it must make data forwarding decisions and knowledge of the topology allows it to make an educated forwarding decision. When the device's topology agent determines that it must rerun its topology algorithm the device generally records this as a count or a time. The reasons for the algorithm needing to be exercised almost always relate to some aspect of topological change or some change that may result in forwarding choices being altered. A network topology server will monitor one device of the topology for a record of the topology algorithm being executed. As shown in FIG. 9, block 902, the network topology server will be notified of the topology change by either polling the change count, being notified by the device, or some other means. This greatly reduces the impact the network monitoring has upon the production network.

The second mechanism that the rich topology model employs to efficiently handle topology change is compartmentalization. The topology model is built upon the natural hierarchies of the represented network. When a topology change does occur, the change, generally, only effects entities within the hierarchical domain where the changing entity resides. The topology model only needs to be updated within this compartment.

As shown in FIG. 9, block 904, the network topology server will determine the hierarchical domain or region that needs to be updated. The region is determined by the protocol, which monitor point the change occurred upon, and the nature of the change. More than one region may need to be updated. For each region, the model is updated 910. For example, when a topology change is noticed, the change is particular to a certain protocol. The topology server may notice that a set of bridges "respanned", that is, the Spanning Tree algorithm has run again, by polling the dot1dStpTopChanges object of a bridge (via SNMP). Or, we may get an OSPF specific trap from a router indicating that the router has a new peer. The algorithm to update the region is specific to the protocol that has caused a change. The Spanning Tree region update is shown in FIGS. 9A and 9B. There are similar mechanisms for updating OSPF Areas, RIP domains, and other protocols.

If the notification results in a change to the topology model (step 936), then the topology server must determine if the change was intentional or not (steps 938, 940). Step 920 will be followed by step 922.

A user of a topological network model may desire to reconstruct a historical topology. A topologically centric fault management system, that handles intermittent faults or network trends, could recreate the topology at any given time with a topological model that recorded topological change. The invention is capable of logging events of topology change.

A topology change could consist of a change in the status of a node, connection, service or network hierarchy. It is natural that the data recorded would be different for each type of change. The time of the change would be recorded in all instances. For example, in FIGS. 9A & B blocks 928 & 918 show a timestamp being logged for both a link change and a device change.

A change in a node would require logging the information identifying the node, any added or changed connections, any added or changed services and any added or changed hierarchical domains. A change in connection would require logging the changing endpoints. For example, in FIG. 9B, block 928 shows that the old model for a spanning tree link can be used to store the timestamp to log when the change occurred and block 930 shows a new link being created to capture the new model. A change of service may require the logging of possible new or changed connections. A hierarchical domain change could require itself and all inhabitants requiring recording in addition to connected domains.

There are two types of change that occur within a network topology, planned and unplanned. Planned changes come in the form of adding network capacity with more connections, or nodes to handle and increase in network traffic. Planned changes could be maintenance related resulting in foreseen network outages. Unplanned outages come in the form of accidental loss of some level of service. Unplanned outages could have originated in erroneous configuration, backhoe fiber cuts, CPU failure, etc.

The invention incorporates a concept that hopes to capture the network designer/manager's intent in the design and management of the network. This concept is called, 'Intent'. When the topological model is constructed, either through automation or manual process, we are capturing the network designer/manager's intent. When a change occurs, the change is marked as being of unknown intention (FIGS. 9 and 9A, Block 917, 930). The model is updated to reflect the new unintended topology and will service requests for the current active topology. After a change occurs and the model is updated, the network manager, administrator, or operator is queried whether this change should then be reflected in the official 'intent' version of the network as shown in FIG. 9C. A list of all elements in the model with 'unknown' intentions is displayed to the network manager, administrator, or operator (Block 946). The user will then examine the change reported (Block 948) and will edit the intended state of the region or element (Block 952).

Figure 10A:
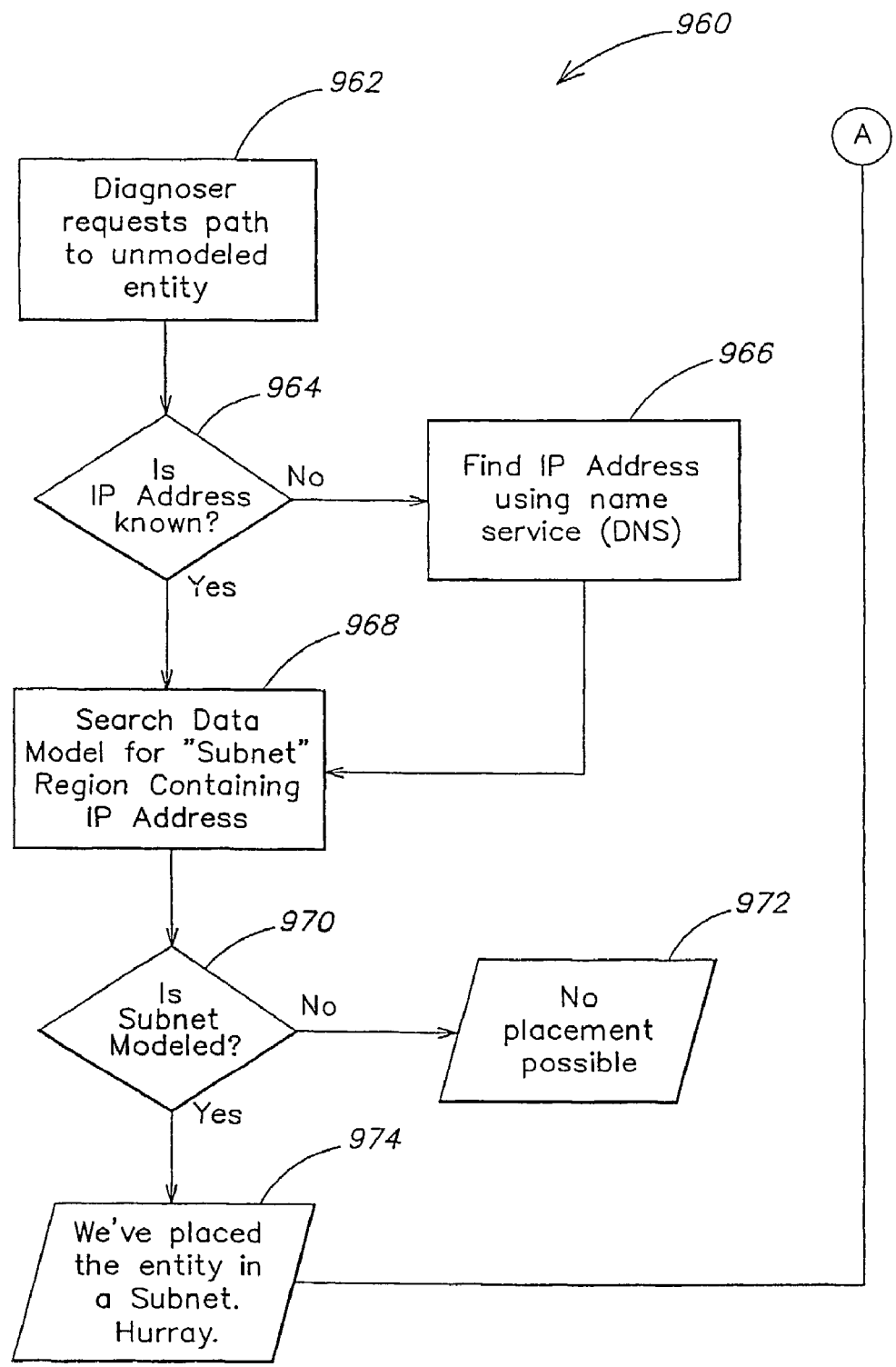
FIGS. 10A and 10B are flow diagrams that illustrate an algorithm for finding a path to or from an unmodeled network entity in a modeled network region.
Figure 10B:
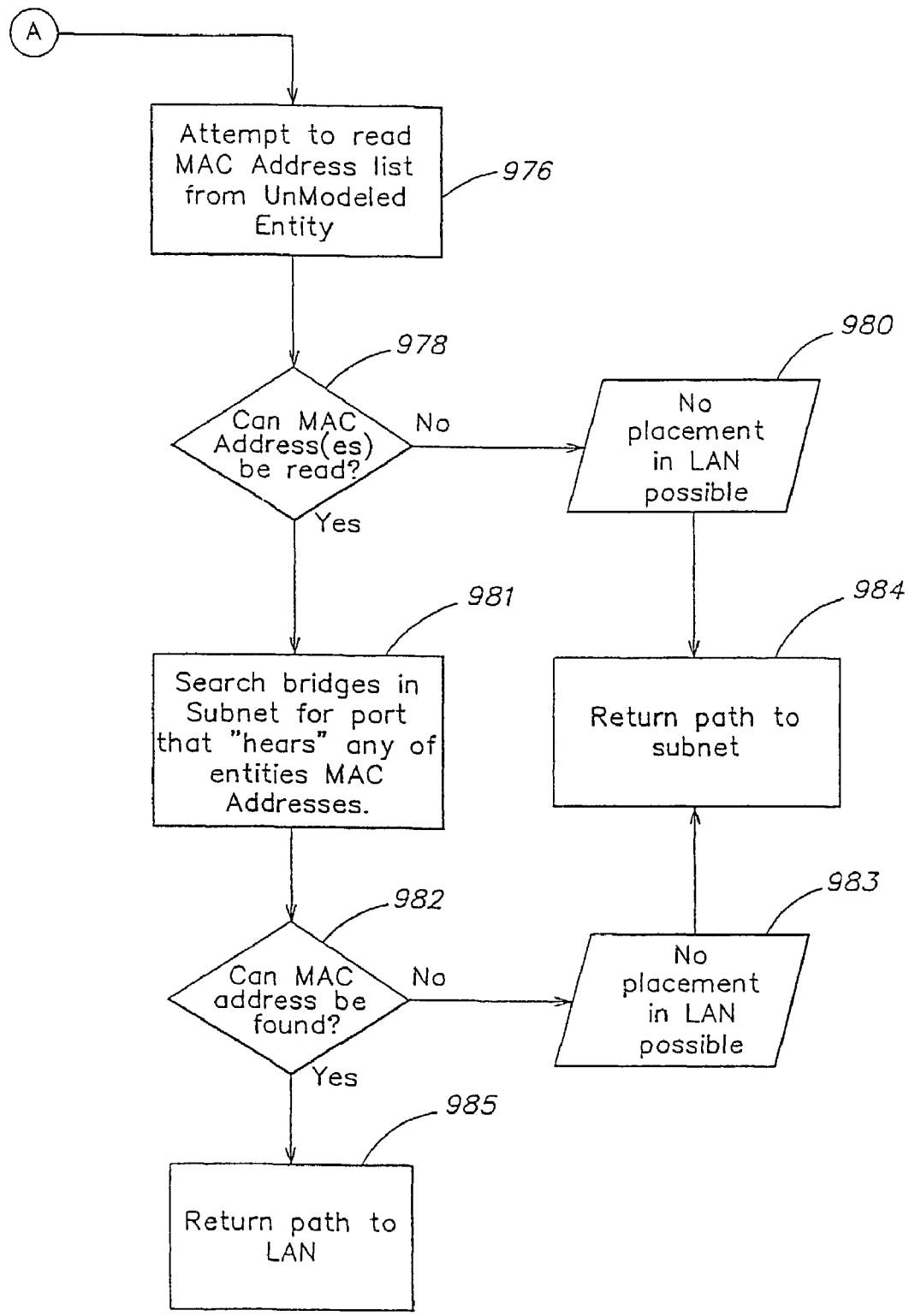

FIGS. 10A and 10B are flow diagrams that illustrate an algorithm for finding a path to or from an unmodeled network entity in a modeled network region. The fault diagnosis engine 12 may request a Layer-2 or Layer-3 data path between two elements, one or both of which is not modeled in the topology mapper 14 (step 962). If the IP address was not specified (conditional 964), we start by resolving the address via a name service, such as DNS (step 966). Once the IP address of the unmodeled entity is known, we search all the subnet regions (step 968). Each subnet region has an IP address range, specified by subnet address and mask. For example, the subnet model 642 (FIG. 8A) contains all IP address between 10.253.8.0 and 10.253.8.15. This range is displayed in the diagram in CIDR notation, as defined in the IETF RFC2096, 10.253.8.0/28. If we can't find a subnet with an IP address range that contains the unmodeled entity's IP Address (conditional 970), the algorithm fails (step 972).

If we can find the subnet (condition 970), we attempt to find the MAC address of the entity (976). Generally, this is done by sending an SNMP request to the entity. However, there are other methods, such as initiating a proxy ARP on a router that borders that subnet. Note the ARP itself will not help if the entity is in a different subnet than the topology mapper host, because the topology mapper host's gateway will responds with the gateway's MAC address, and not that of the unmodeled entity. If the MAC address can be determined (conditional 978), we search the modeled bridges for a port that has this MAC address in its forwarding table (also known as Source Address Table or SAT) (step 981). If we find such a bridge port (conditional 982), we know that this unmodeled entity is logically placed in the LAN attached to this port, and we can return the path to this LAN (step 985). Otherwise, we just return a path to the subnet (step 984).

Figure 11:
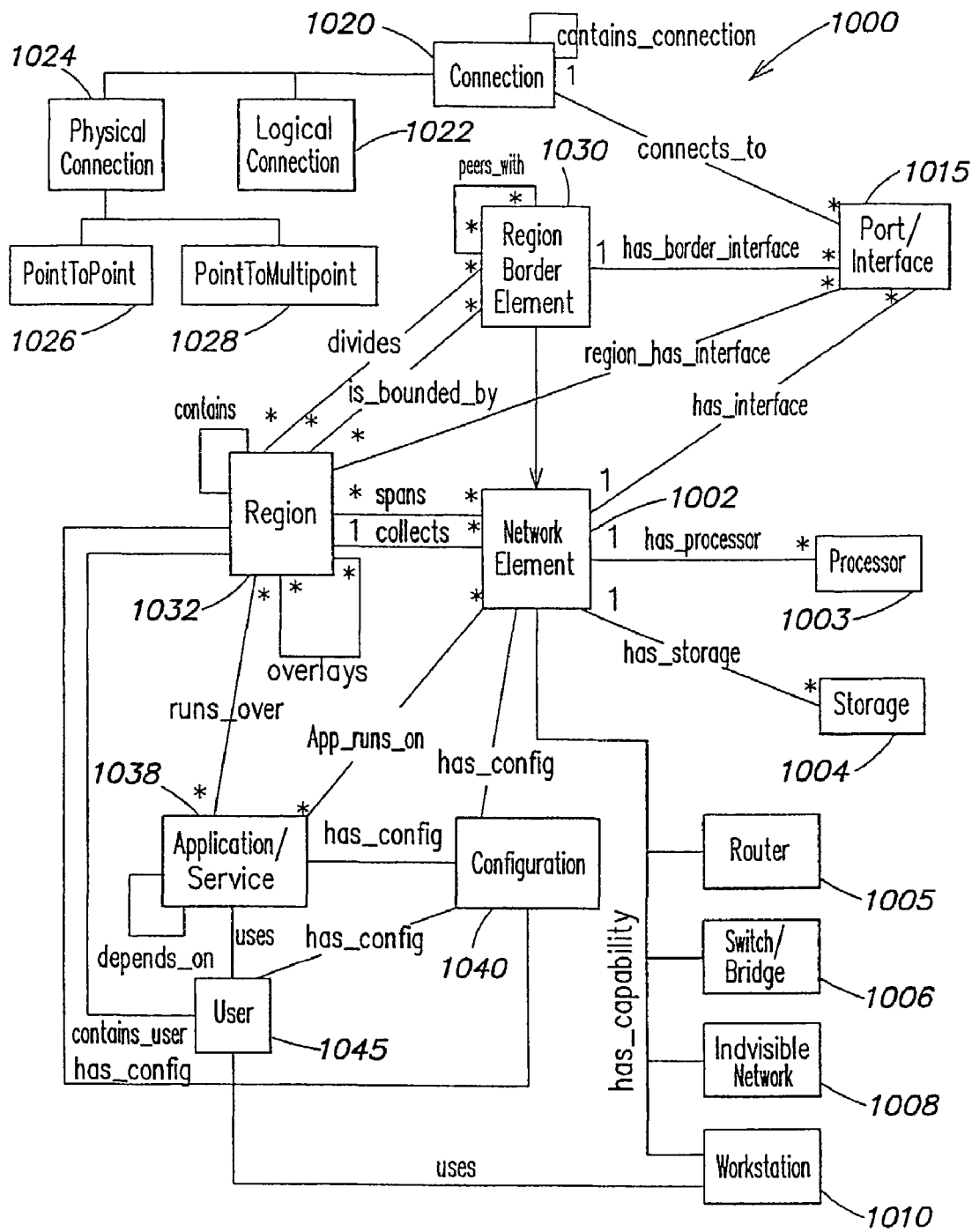
FIG. 11 is a semantic data model used when constructing the rich multi-layer topological model of FIGS. 8 and 8A.

FIG. 11 is a semantic data model used when constructing the rich multi-layer topological model shown in FIGS. 8 and 8A. Semantic data model 1000 illustrates networking rules for relating network components to each other. The components include network elements, regions, and ports. The semantic data model also provides logical information useful for understanding the physical and logical connections embodied in the rich multi-layer topology model.

Semantic data model 1000 includes nodes, connections and services. A node is a physical or logical entity that serves as an aggregation point of a particular function. An example of such a physical entity is a chassis that has multiple repeated ports. An example of such a logical entity is a VRRP virtual router that has multiple hot-standby physical routers.

Connections 1020 can be either physical or logical communication interfaces between entities, wherein a connection can be one-to-one 1026, one-to-many 1028 and many-to-many. For example, a physical connection 1024 is a 10BaseT Ethernet cable plugged into two ports of separate Ethernet switches. A logical connection 1022 is an HTTP session between a web client and a web server.

A service, or capability, is a description of functionality provided by an entity. An example is a DNS server running on a workstation 1010, or an OSPF routing application running on a routing device 1005.

The modeling of the interdependencies of a network's collection of nodes, connections and services provide the rich, multi-layered topology to a model-based, topology centric fault management system (described in the co-pending PCT application entitled: Systems and Methods for Diagnosing Faults in Computer Networks, filed on May 7, 2001, which is incorporated by reference).

Semantic data model 1000 also supports the notion of hierarchical regions, containment with exclusive membership and overlay with partial membership shown in FIGS. 2, 2A, 6, 8 and 8A. This notion is embodied by the Region 1032 and Region Border Element 1030 models. For example, a hierarchical region could come from an OSPF network, which network includes a region, areas within the region and subnets within the areas. Another example of containment with exclusive membership is an FDDI LAN, wherein all members of the FDDI LAN are contained within the next hierarchical domain, a subnet or VLAN. For example, an overlay with partial membership is an MPLS path over several routers running OSPF. These routers can each be a member of a different OSPF area. Not all members of each area will be members of the MPLS path.

Network Elements 1002 such as devices may have certain configuration parameters 1040 which need to be modeled and used for fault diagnosis.

The rich, multi-layer topological model includes all such data about the logical and physical entities, connections, services and functions, and abstract containers. A topology centric fault management system can use the above-mentioned data to accurately and effectively diagnose a root cause fault and show impact of that fault and its symptoms.

The above-described topology mapper 14 may be used separately or together with other units of network management system 10, described in connection with FIG. 1. Network management system 10 uses model data stored in topology mapper 14 for network management, and fault management process. The fault management includes a fault detection phase, a fault diagnosis phase, an impact analysis phase, a prioritization phase, a presentation phase, a recourse phase, and a resolution phase. This is a phased, componentized, but interconnected process that can perform all aspects of fault management.

A generic fault diagnosis engine, suitable for fault diagnosis in any system, is described in the co-pending PCT application entitled: Systems and Methods for Managing and Analyzing Faults In Computer Networks, filed on May 7, 2001, which is incorporated by reference.

To perform a path-dependent fault diagnosis, the generic fault diagnosis engine is applied to a path dependent algorithm that tests the network using a network model provided by topology mapper 14. This path-dependent fault diagnosis is described in the co-pending PCT application entitled: Systems and Methods for Diagnosing Faults in Computer Networks. filed on May 7, 2001, which is incorporated by reference.

Help desk system 18 (FIG. 1) is described in the co-pending PCT application entitled: Help Desk Systems and Methods for use with Communications Networks, filed on May 7, 2001, which is incorporated by reference.

Numerous other embodiments not described in detail here can apply the principles described to particular applications and are within the scope of the claims.

What is claimed is:

1. A method for constructing a multi-layer topological model of a computer network, comprising:
    discovering a plurality of routers in the computer network, wherein discovering the plurality of routers further includes nominating the plurality of routers for placement in a multiple layer topology of the computer network;
    discovering a Border Gateway Protocol (BGP) confederation topology in the computer network in response to determining that one or more network protocols discovered in the computer network organize the plurality of routers into a plurality of autonomous systems, wherein discovering the BGP confederation topology includes:
        discovering a first subset of the plurality of routers in the plurality of autonomous systems that have external BGP (EBGP) peers, wherein discovering the first subset of the plurality of routers that have the EBGP peers defines one or more adjacencies between the plurality of autonomous systems;
        discovering a second subset of the plurality of routers in the plurality of autonomous systems that have internal BGP (IBGP) peers, wherein discovering the second subset of the plurality of routers that have the IBGP peers defines one or more clusters within the plurality of autonomous systems; and
        determining the BGP confederation topology in response to discovering the first subset of the plurality of routers and the second subset of the plurality of routers, wherein the BGP confederation topology includes the one or more adjacencies between the plurality of autonomous systems and the one or more clusters within the plurality of autonomous systems;
    determining the multiple layer topology of the computer network, wherein the multiple layer topology includes physical dependencies that represent physical connections between the plurality of routers and logical dependencies that represent the one or more adjacencies and the one or more clusters in the BGP confederation topology; and
    displaying a model of the multiple layer topology that includes the physical connections between the plurality of routers, the one or more adjacencies between the plurality of autonomous systems, and the one or more clusters within the plurality of autonomous systems, wherein the displayed model of the multiple layer topology represents interdependencies between different layers of the computer network.

2. The method of claim 1, further comprising:
    monitoring a representative one of the plurality of routers to determine whether the BGP confederation topology or the multiple layer topology has changed; and
    updating the model of the multiple layer topology in response to the representative router indicating that the BGP confederation topology or the multiple layer topology has changed.

3. The method of claim 2, wherein updating the model of the multiple layer topology includes:
    determining a compartment where the BGP confederation topology or the multiple layer topology changed, wherein the compartment includes at least one of a hierarchical domain or a hierarchical region of the computer network; and
    updating the model of the multiple layer topology within the compartment where the BGP confederation topology or the multiple layer topology changed.

4. The method of claim 1, further comprising:
    maintaining multiple versions of the model of the multiple layer topology, wherein each of the multiple versions includes a start date and an end date indicating a period of time during which the respective version existed; and
    displaying relationships between two or more of the multiple versions of the model.

5. The method of claim 4, wherein the multiple versions of the model include a current version of the multiple layer topology and at least one of a historical version of the multiple layer topology or an intended version of the multiple layer topology.

6. The method of claim 5, further comprising reconstructing the historical version of the multiple layer topology from the current version of the multiple layer topology using a record of one or more changes to the multiple layer topology of the computer network, wherein the historical version of the multiple layer topology is reconstructed at a particular time using one or more timestamps in the record of the one or more changes to the multiple layer topology.

7. The method of claim 1, wherein the
    first subset of the plurality of routers that have the EBGP peers define border nodes within the plurality of autonomous systems, and wherein
    the displayed model of the multiple layer topology further includes the border nodes within the plurality of autonomous systems.

8. The method of claim 1, wherein discovering the second subset of the plurality of routers that have the IBGP peers further includes:
    discovering at least one of the plurality of routers in the second subset that has three or more IBGP peers; and
    defining at least one of the one or more clusters in response to determining that the three or more IBGP peers for the at least one router each have three or more IBGP peers, wherein the at least one cluster includes the at least one router, the three or more IBGP peers for the at least one router, and the three or more IBGP peers for each of the three or more IBGP peers of the at least one router.

9. The method of claim 1, further comprising:

discovering a third subset of the plurality of routers that use a Routing Information Protocol to route data packets within the BGP confederation, wherein discovering the third subset of the plurality of routers defines one or more neighbors and one or more interfaces in one or more routing domains within the BGP confederation; and displaying the one or more routing domains, the one or more neighbors, and the one or more interfaces within the displayed model of the multiple layer topology.

10. The method of claim 9, further comprising:

discovering a fourth subset of the plurality of routers that use an Open Shortest Path First Protocol to transport the data packets within the BGP confederation, wherein discovering the fourth subset of the plurality of routers defines one or more data paths between one or more sub-domains within the one or more routing domains; and displaying the one or more sub-domains and the one or more data paths within the displayed model of the multiple layer topology.

11. The method of claim 10, further comprising:

discovering one or more subnets within the one or more sub-domains, wherein discovering the one or more subnets defines one or more addressing spaces for the fourth subset of the routers; and displaying the one or more subnets and one or more addressing spaces within the displayed model of the multiple layer topology.

12. The method of claim 11, further comprising:

discovering a fifth subset of the plurality of routers that run a Spanning Tree Protocol within the BGP confederation, wherein discovering the fifth subset of the plurality of routers defines one or more spanning tree topologies within the one or more subnets that include one or more spanning tree regions and one or more spanning tree links; and displaying the one or more spanning tree topologies, the one or more spanning tree regions, and the one or more spanning tree links within the displayed model of the multiple layer topology.

13. The method of claim 11, further comprising:

discovering a fifth subset of the plurality of routers that run a Transparent Bridging Protocol within the BGP confederation, wherein discovering the fifth subset of the plurality of routers defines one or more transparent bridging topologies within the one or more subnets that include a plurality of physically connected ports in one or more bridged local area networks; and displaying the one or more transparent bridging topologies and the ports physically connected in the one or more bridged local area networks within the displayed model of the multiple layer topology.

14. The method of claim 1, wherein discovering the second subset of the plurality of routers that have the IBGP peers further includes:

discovering at least one of the plurality of routers in the second subset that has an IBGP peer within at least one of the one or more clusters; and adding the at least one router to the at least one cluster that includes the IBGP peer for the at least one router.

15. The method of claim 1, wherein discovering the second subset of the plurality of routers that have the IBGP peers further includes:

discovering at least one of the plurality of routers in the second subset that has two IBGP peers that further have three or more IBGP peers;

adding the at least one router to at least one of the one or more clusters in response to determining that the at least one cluster includes the two IBGP peers for the at least one router; and creating the at least one cluster in response to determining that none of the one or more clusters includes the two IBGP peers for the at least one router, wherein the created cluster includes the at least one router, the two IBGP peers for the at least one router, and the three or more IBGP peers for each of the two IBGP peers of the at least one router.

16. A device readable storage medium having computer executable instructions recorded thereon, wherein executing the instructions on a computer causes the computer to perform a method for constructing a multi-layer topological model of a computer network, the method comprising:

discovering a plurality of routers in the computer network, wherein discovering the plurality of routers further includes nominating the plurality of routers for placement in a multiple layer topology of the computer network;

discovering a Border Gateway Protocol (BGP) confederation topology in the computer network in response to determining that one or more network protocols discovered in the computer network organize the plurality of routers into a plurality of autonomous systems, wherein discovering the BGP confederation topology includes:

discovering a first subset of the plurality of routers in the plurality of autonomous systems that have external BGP (EBGP) peers, wherein discovering the first subset of the plurality of routers that have the EBGP peers defines one or more adjacencies between the plurality of autonomous systems;

discovering a second subset of the plurality of routers in the plurality of autonomous systems that have internal BGP (IBGP) peers, wherein discovering the second subset of the plurality of routers that have the IBGP peers defines one or more clusters within the plurality of autonomous systems; and determining the BGP confederation topology in response to discovering the first subset of the plurality of routers and the second subset of the plurality of routers, wherein the BGP confederation topology includes the one or more adjacencies between the plurality of autonomous systems and the one or more clusters within the plurality of autonomous systems;

determining the multiple layer topology of the computer network, wherein the multiple layer topology includes physical dependencies that represent physical connections between the plurality of routers and logical dependencies that represent the one or more adjacencies and the one or more clusters in the BGP confederation topology; and displaying a model of the multiple layer topology that includes the physical connections between the plurality of routers, the one or more adjacencies between the plurality of autonomous systems, and the one or more clusters within the plurality of autonomous systems, wherein the displayed model of the multiple layer topology represents interdependencies between different layers of the computer network.

17. The device readable storage medium of claim 16, wherein the method further comprises:

monitoring a representative one of the plurality of routers to determine whether the BGP confederation topology or the multiple layer topology has changed; and updating the model of the multiple layer topology in response to the representative router indicating that the BGP confederation topology or the multiple layer topology has changed.

18. The device readable storage medium of claim 16, wherein the method further comprises:

maintaining multiple versions of the model of the multiple layer topology, wherein each of the multiple versions includes a start date and an end date indicating a period of time during which the respective version existed; and displaying relationships between two or more of the multiple versions of the model.

19. The device readable storage medium of claim 18, wherein the multiple versions of the model include a current version of the multiple layer topology and at least one of a historical version of the multiple layer topology or an intended version of the multiple layer topology.

20. The device readable storage medium of claim 19, wherein the method further comprises reconstructing the historical version of the multiple layer topology from the current version of the multiple layer topology using a record of one or more changes to the multiple layer topology of the computer network, wherein the historical version of the multiple layer topology is reconstructed at a particular time using one or more timestamps in the record of the one or more changes to the multiple layer topology.

21. A network management system for constructing a multi-layer topological model of a computer network, the system comprising:

a computer network that includes a plurality of routers;

a topology mapper configured to:

discover the plurality of routers in the computer network, wherein the topology mapper is further configured to nominate the plurality of routers for placement in a multiple layer topology of the computer network;

discover a Border Gateway Protocol (BGP) confederation topology in the computer network in response to determining that one or more network protocols discovered in the computer network organize the plurality of routers into a plurality of autonomous systems, wherein to discover the BGP confederation topology, the topology mapper is further configured to:

discover a first subset of the plurality of routers in the plurality of autonomous systems that have external BGP (EBGP) peers, wherein discovering the first subset of the plurality of routers that have the EBGP peers defines one or more adjacencies between the plurality of autonomous systems;

discover a second subset of the plurality of routers in the plurality of autonomous systems that have internal BGP (IBGP) peers, wherein discovering the second subset of the plurality of routers that have the IBGP peers defines one or more clusters within the plurality of autonomous systems;

determine the BGP confederation topology in response to discovering the first subset of the plurality of routers and the second subset of the plurality of routers, wherein the BGP confederation topology includes the one or more adjacencies between the plurality of autonomous systems and the one or more clusters within the plurality of autonomous systems; and determine the multiple layer topology of the computer network, wherein the multiple layer topology includes physical dependencies that represent physical connections between the plurality of routers and logical dependencies that represent the one or more adjacencies and the one or more clusters in the BGP confederation topology; and a presentation module that receives the multiple layer topology of the computer network from the topology mapper, wherein the presentation module is configured to:

display a model of the multiple layer topology that includes the physical connections between the plurality of routers, the one or more adjacencies between the plurality of autonomous systems, and the one or more clusters within the plurality of autonomous systems, wherein the displayed model of the multiple layer topology represents interdependencies between different layers of the computer network.

22. The system of claim 21, further comprising a network topology server configured to:

monitor a representative one of the plurality of routers to determine whether the BGP confederation topology or the multiple layer topology has changed; and update the model of the multiple layer topology in response to the representative router indicating that the BGP confederation topology or the multiple layer topology has changed.

23. The system of claim 21, wherein the topology mapper is further configured to maintain multiple versions of the model of the multiple layer topology, wherein each of the multiple versions includes a start date and an end date indicating a period of time during which the respective version existed, and wherein the presentation module is further configured to display relationships between two or more of the multiple versions of the model.

* * * * *

UNITED STATES PATENT AND TRADEMARK OFFICE
CERTIFICATE OF CORRECTION

PATENT NO. : 7,752,024 B2 Page 1 of 1
APPLICATION NO. : 10/282869
DATED : July 6, 2010
INVENTOR(S) : Scott Ball et al.

It is certified that error appears in the above-identified patent and that said Letters Patent is hereby corrected as shown below:

On the title page, please insert the following Items (63) and (60):

-- Related U.S. Application Data

(63)    Continuation of application No. PCT/US01/14767, filed on May 7, 2001.

(60)    Provisional application No. 60/202,296, filed on May 5, 2000, provisional application No. 60/202,299, filed on May 5, 2000, provisional application No. 60/202,298, filed on May 5, 2000. --

Signed and Sealed this

Fourteenth Day of September, 2010

David J. Kappos
*Director of the United States Patent and Trademark Office*